(12) United States Patent
Momosaki

(10) Patent No.: US 8,285,114 B2
(45) Date of Patent: Oct. 9, 2012

(54) ELECTRONIC APPARATUS AND DISPLAY METHOD

(75) Inventor: Kohei Momosaki, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 804 days.

(21) Appl. No.: 12/203,819

(22) Filed: Sep. 3, 2008

(65) Prior Publication Data

US 2009/0089837 A1 Apr. 2, 2009

(30) Foreign Application Priority Data

Sep. 27, 2007 (JP) .................................. 2007-252457

(51) Int. Cl.
*H04N 9/80* (2006.01)

(52) U.S. Cl. ........................................ 386/241; 386/248

(58) Field of Classification Search .................... 386/241
See application file for complete search history.

(56) References Cited

U.S. PATENT DOCUMENTS

| 2008/0016089 | A1 | 1/2008 | Nishiyama |
| 2008/0155627 | A1* | 6/2008 | O'Connor et al. ............ 725/109 |
| 2011/0072466 | A1* | 3/2011 | Basso et al. ..................... 725/47 |

FOREIGN PATENT DOCUMENTS

| JP | 2001-309269 | 11/2001 |
| JP | 2004-207948 | 7/2004 |
| JP | 2006-054622 | 2/2006 |
| JP | 2007-142785 | 6/2007 |

OTHER PUBLICATIONS

Japanese Patent Application No. 2007-252457, Notice of Reasons for Rejection, mailed Sep. 27, 2011, (with English Translation).

* cited by examiner

*Primary Examiner* — Thai Tran
*Assistant Examiner* — William Tran
(74) *Attorney, Agent, or Firm* — Blakely, Sokoloff, Taylor & Zafman LLP

(57) ABSTRACT

According to one embodiment, an electronic apparatus includes a storage device which stores section attribute information which specifies a start time point and an end time point of at least one predetermined attribute section of a plurality of attribute sections which are included in the video content data. A display process module displays, on a display screen, a section bar including a bar area which is indicative of a position of the predetermined attribute section in a sequence of the video content data, on the basis of the section attribute information. A playback process module executes, on the display screen, playback of moving picture data in the video content data which belongs to the predetermined attribute section, on the basis of the section attribute information, in a case where an event of requesting playback of the video content data of the predetermined attribute section is input.

13 Claims, 19 Drawing Sheets

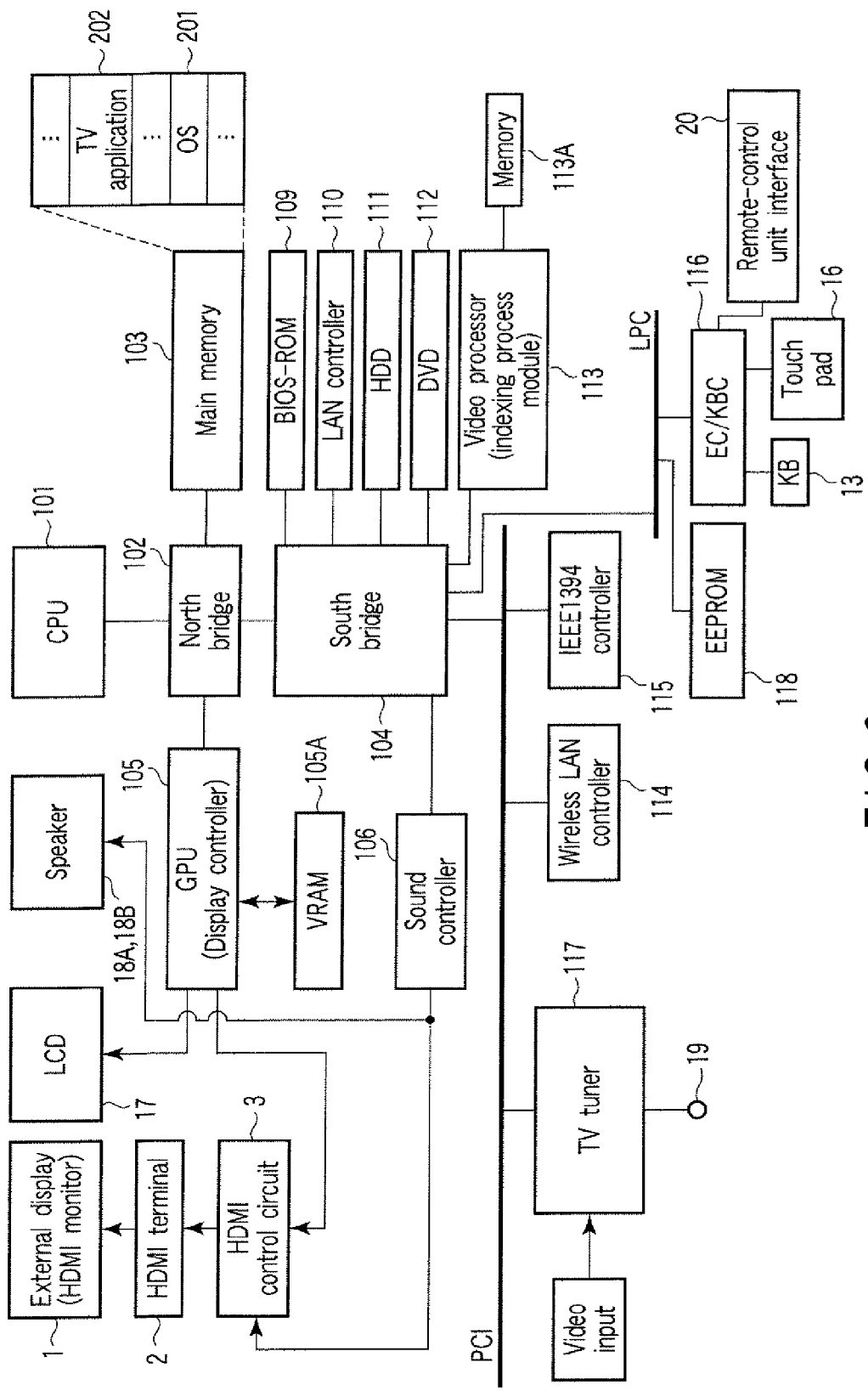
F I G. 2

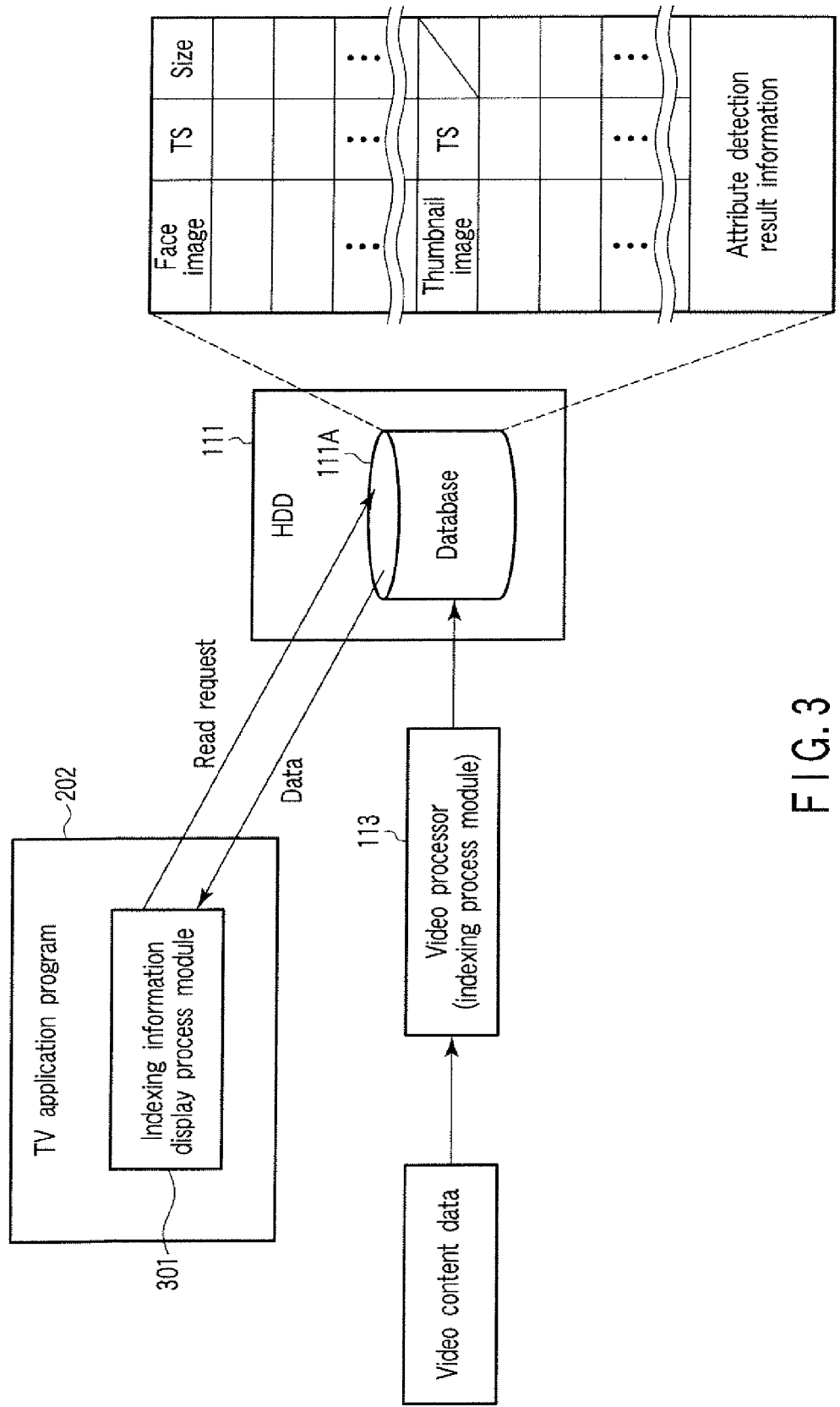
F I G. 3

Attribute detection result information

CM section table

| CM section 1 | Start time, end time |
|---|---|
| CM section 2 | Start time, end time |
| ⋮ | ⋮ |

Music section table

| Music section 1 | Start time, end time |
|---|---|
| Music section 2 | Start time, end time |
| ⋮ | ⋮ |

Talk section table

| Talk section 1 | Start time, end time |
|---|---|
| Talk section 2 | Start time, end time |
| ⋮ | ⋮ |

Cheer/excitement level table

| Time | Cheer level | Excitement level |
|---|---|---|
| T1 | 10 | 5 |
| T2 | 20 | 5 |
| T3 | 10 | 6 |
| ⋮ | ⋮ | ⋮ |

F I G. 4

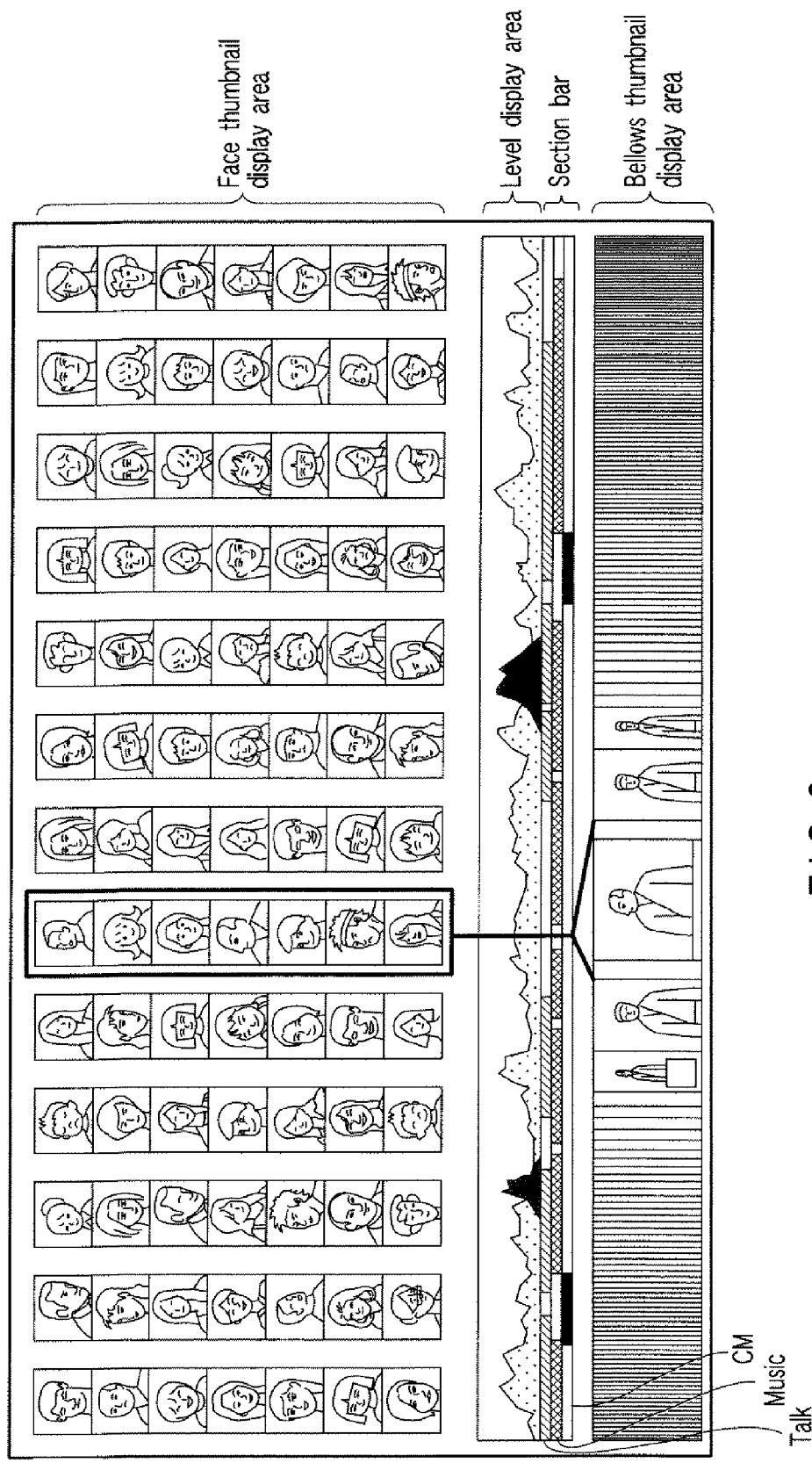
F I G. 6

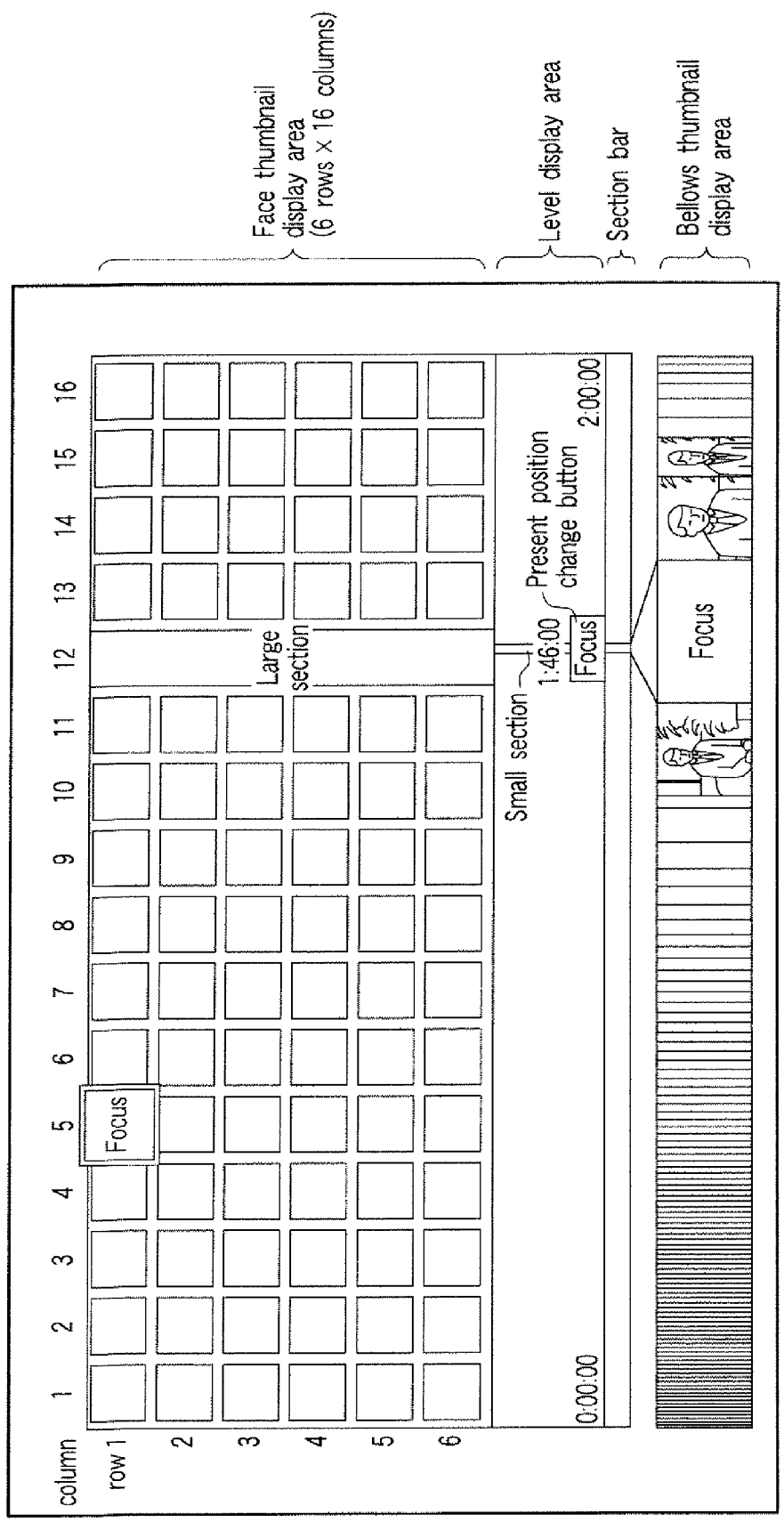
F I G. 8

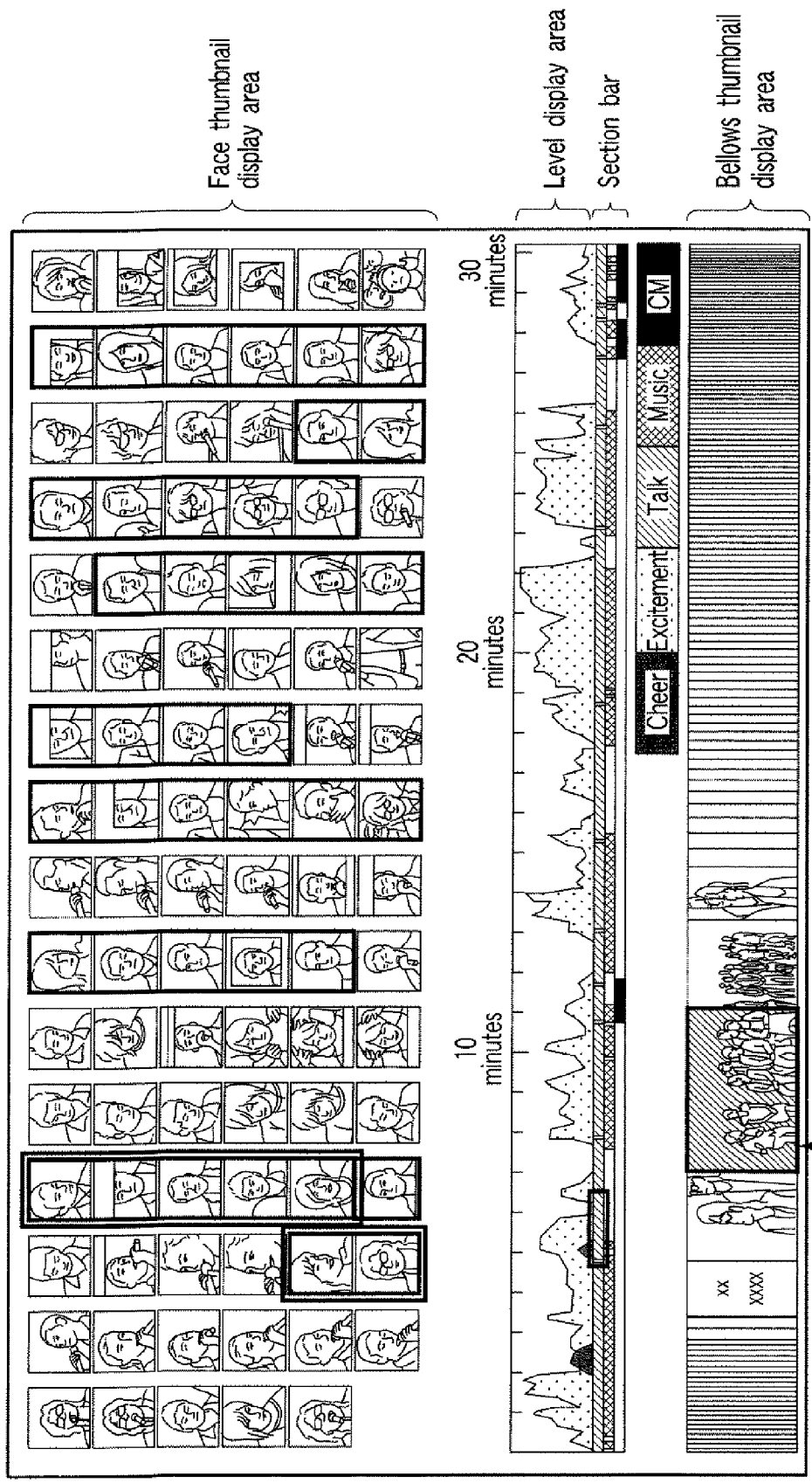
F I G. 16

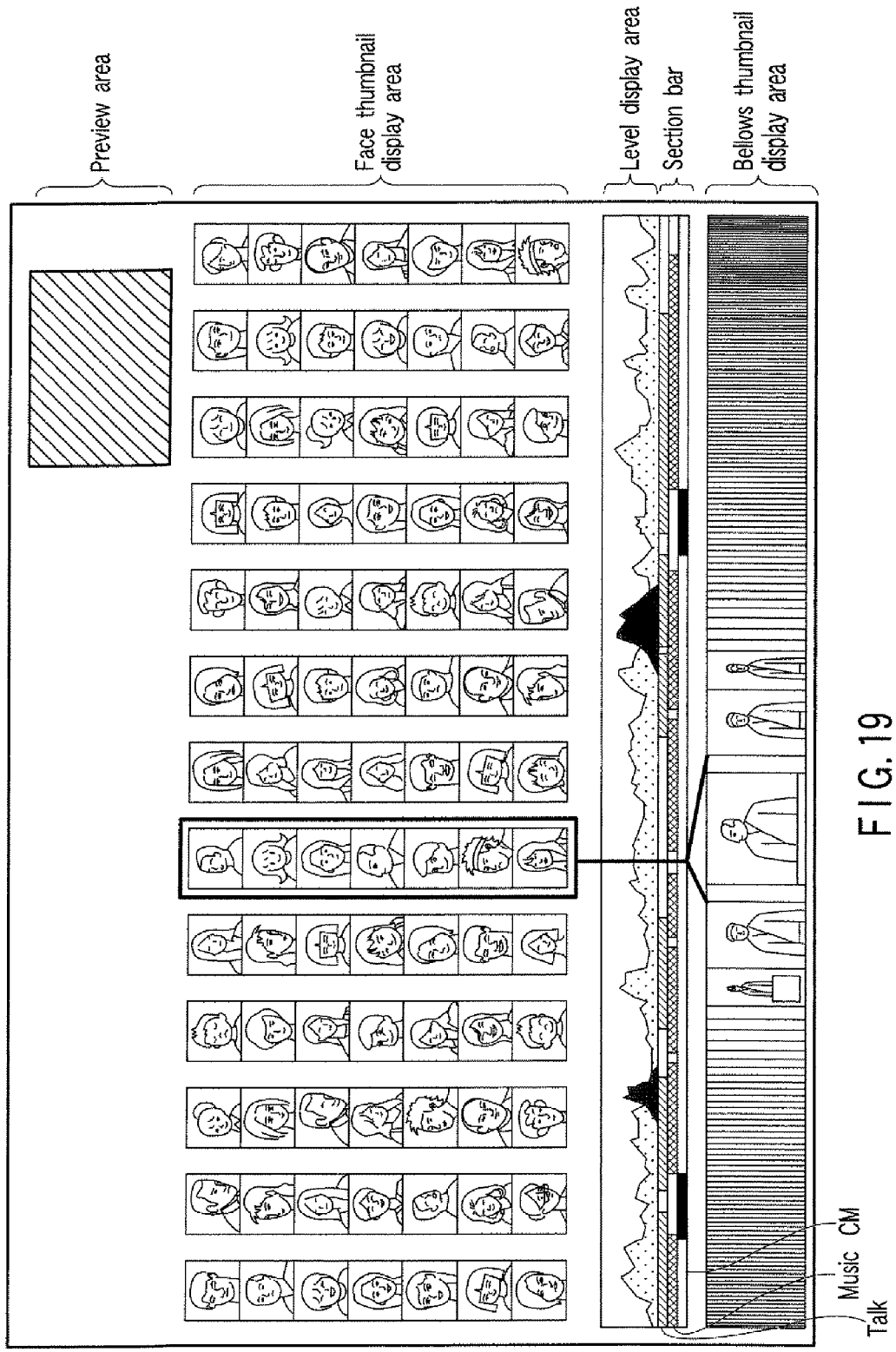
F I G. 19

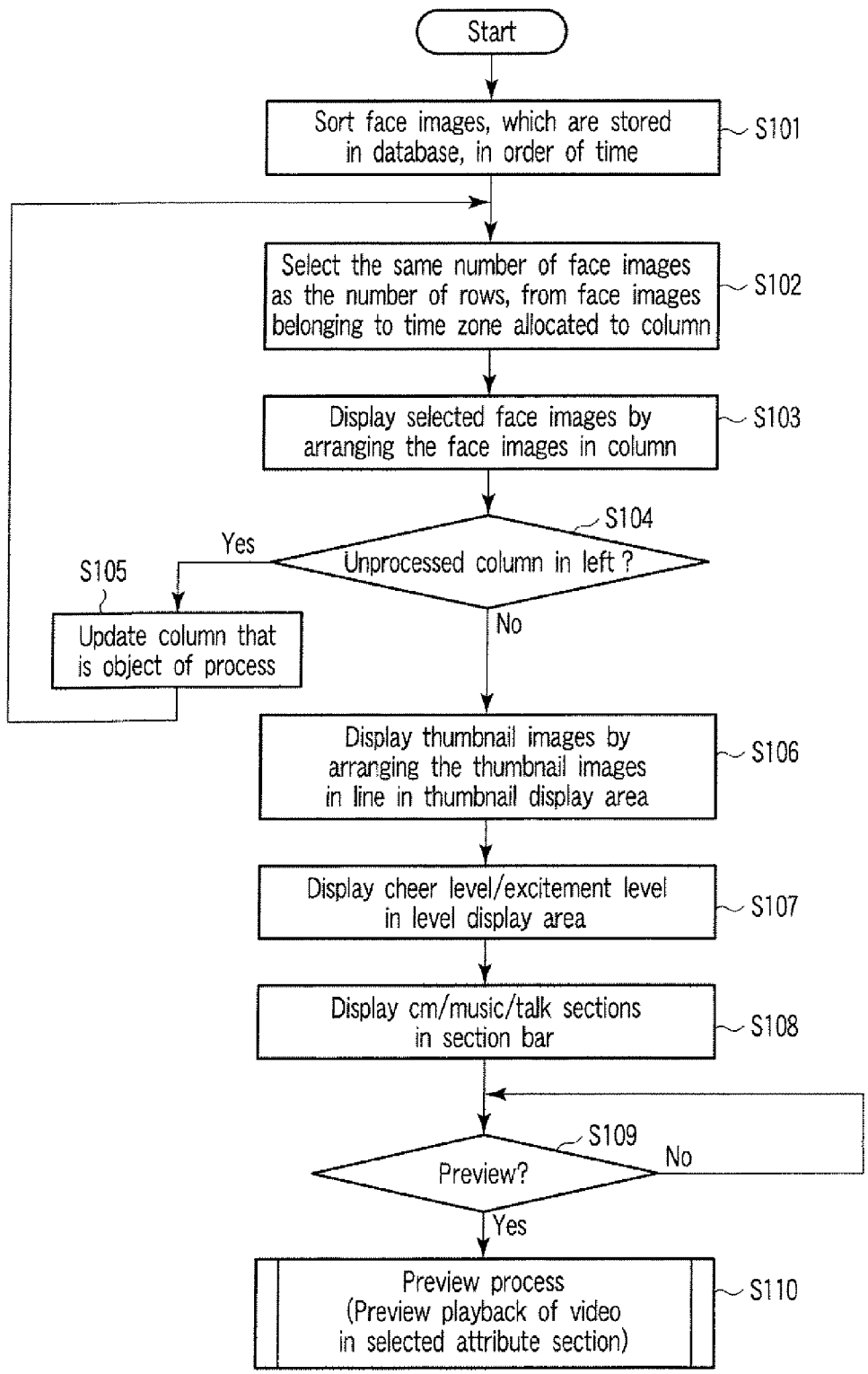
F I G. 20

ELECTRONIC APPARATUS AND DISPLAY METHOD

CROSS-REFERENCE TO RELATED APPLICATIONS

This application is based upon and claims the benefit of priority from Japanese Patent Application No. 2007-252457, filed Sep. 27, 2007, the entire contents of which are incorporated herein by reference.

BACKGROUND

1. Field

One embodiment of the present invention relates to an electronic apparatus and a display method for displaying an outline of video content data.

2. Description of the Related Art

In general, an electronic apparatus, such as a video recorder or a personal computer, is capable of recording and playing back various video content data such as TV broadcast program data. In this case, although titles are added to the respective video content data stored in the electronic apparatus, it is difficult for a user to understand, from the title alone, what kind of content each video content data has. In order to understand the content of each video content data, it is thus necessary to play back the video content data. In the case of playing back video content data of a long total time, however, even if a quick forward function or the like is used, a great deal of time is needed.

Recently, a technique of displaying a list of thumbnail images, which correspond to some still images extracted from video content data, has begun to be developed.

Jpn. Pat. Appln. KOKAI Publication No. 2001-309269 discloses an apparatus having an appearing person list display function. This apparatus has a function of displaying, in an arranged order, the face images of persons appearing in video content as a list of persons appearing in the video content.

To display a list of thumbnail images is useful as a technique of presenting the outline of video content data to the user.

Actually, however, there is a limit to the number of thumbnail images which can be displayed. It is thus difficult for the user to understand the details of each part of the video content from only the list of thumbnail images.

In usual cases, many video content data include a plurality of kinds of attribute sections, such as a commercial section and other sections.

However, in the appearing person list display function of Jpn. Pat. Appln. KOKAI Publication No. 2001-309269, no consideration is given to the attribute sections, and the images of the faces of the appearing persons are simply displayed.

It is thus necessary to realize a novel function of presenting, to the user, the content of a specific attribute section in the video content data.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing an example of the system configuration of the electronic apparatus according to the embodiment;

FIG. 3 is an exemplary block diagram for describing an indexing information display function of the electronic apparatus according to the embodiment;

FIG. 4 shows an example of section attribute information (attribute detection result information) which is used in the electronic apparatus according to the embodiment;

FIG. 6 shows an example of an indexing view screen which is displayed on a display device by the electronic apparatus according to the embodiment;

FIG. 8 is an exemplary view for explaining the relationship between the face thumbnail display area and a bellows thumbnail display area, which are included in the indexing view screen shown in FIG. 6;

FIG. 16 shows an example of the indexing view screen in a case where a talk section is selected on the indexing view screen shown in FIG. 6;

FIG. 19 shows another example of the indexing view screen which is displayed on the display device by the electronic apparatus according to the embodiment;

FIG. 20 is an exemplary flow chart illustrating an example of the procedure of an indexing information display process which is executed by the electronic apparatus according to the embodiment.

DETAILED DESCRIPTION

Various embodiments according to the invention will be described hereinafter with reference to the accompanying drawings. In general, according to one embodiment of the invention, there is provided An electronic apparatus comprising: a storage device which stores section attribute information which specifies a start time point and an end time point of at Least one predetermined attribute section of a plurality of attribute sections including a commercial section, a section other than the commercial section, a music section in which music is played, a talk section in which a talk is made by a person, a cheer section having a cheer level of a predetermined value or more and an excitement section having an excitement level of a predetermined value or more, which are included in the video content data; a display process module configured to display, on a display screen, a section bar including a bar area which is indicative of a position of the predetermined attribute section in a sequence of the video content data, on the basis of the section attribute information; and a playback process module configured to execute, on the display screen, playback of moving picture data in the video content data which belongs to the predetermined attribute section, on the basis of the section attribute information, in a case where an event of requesting playback of the video content data of the predetermined attribute section is input.

Figure 1:
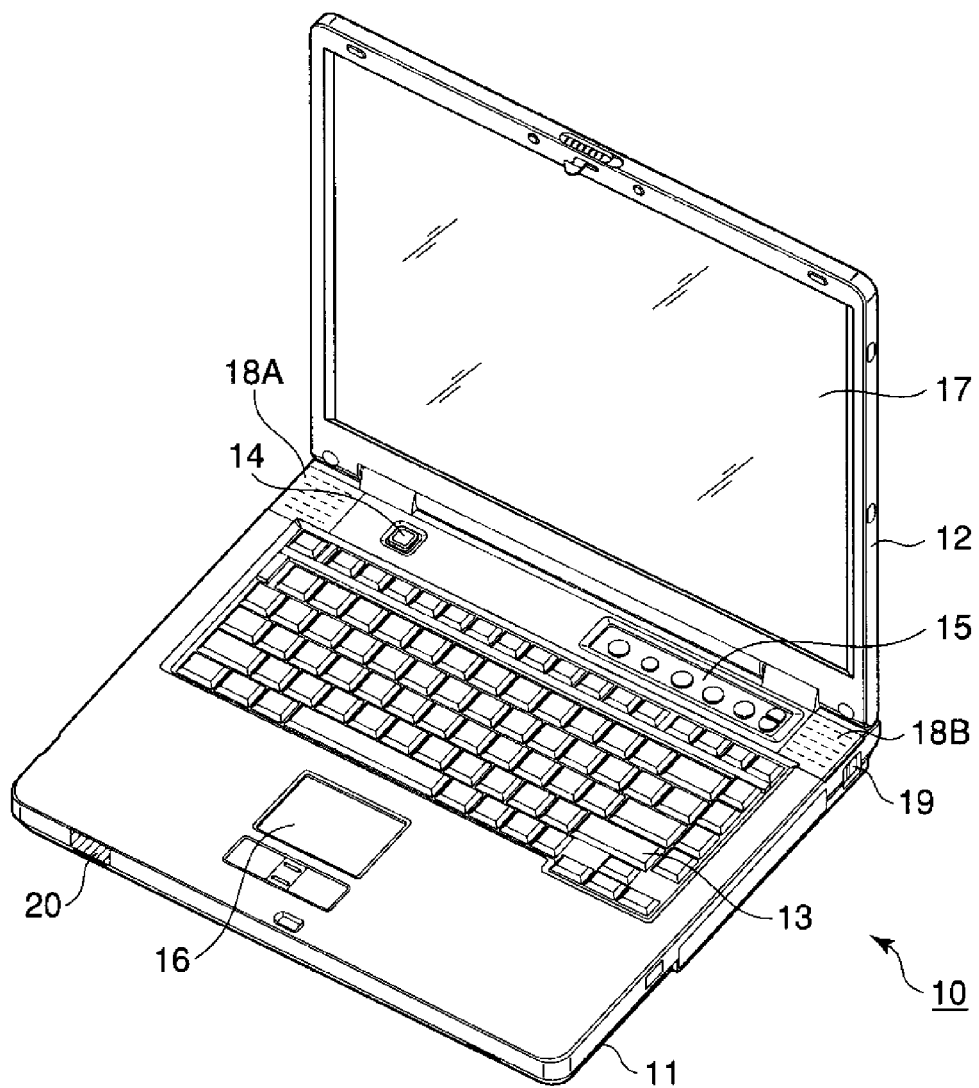
FIG. 1 is an exemplary perspective view showing the external appearance of an electronic apparatus according to an embodiment of the invention.

To begin with, referring to FIG. 1 and FIG. 2, the structure of an electronic apparatus according to an embodiment of the invention is described. The electronic apparatus according to this embodiment is realized, for example, by a notebook portable personal computer 10 functioning as an information processing apparatus.

The personal computer 10 is capable of recording and playing back video content data (also referred to as "audio-visual content data") such as broadcast program data and video data which is input from an external device. Specifically, the personal computer 10 has a television (TV) function for executing viewing/listening and recording of broadcast program data which is broadcast by a TV broadcast signal. This TV function is realized, for example, by a TV application program which is preinstalled in the personal computer 10. In addition, the TV function includes a function of recording video data which is input from an external AV device, and a function of playing back recorded video data and recorded broadcast program data.

Further, the personal computer 10 has an indexing information display function which detects a position of a specific attribute section included in video content data such as video data stored in the personal computer 10 or broadcast program data, and displays, on a display screen, a section bar including a bar area which is indicative of the position of the specific attribute section in a sequence of the video content data. This indexing information display function is implemented, for example, as one of functions included in the TV function.

As the specific attribute section, use is made of, for instance, at least one of a commercial (CM) section, a section (main section) other than the CM section, a music section in which music is played, a talk section in which a talk is made by a person, a cheer section having a cheer level of a predetermined value or more and an excitement section having an excitement level of a predetermined value or more. In the case of where the broadcast program data includes main program data and the CM section inserted in the main program data, the main section corresponds to the main program data of the broadcast program data.

The personal computer 10 also has a preview function of (simply) playing back moving picture data, which is included in video content data, with attention being paid to the specific attribute section. For example, in the case where a certain attribute section is selected by a user's operation of the section bar, the personal computer 10 executes, on the same display screen as the display screen on which the section bar is displayed, (simple) playback (preview playback) of the moving picture data in the video content data, which belongs the selected attribute section.

The indexing information display function includes a thumbnail image display function of displaying, for example, a list of still images which are extracted from the moving picture data included in the video content data. This thumbnail image display function is a function for presenting, for the example, the outline of the video content data to the user.

Further, the indexing information display function includes a face image list display function for displaying, for instance, a list of face images of persons who appear in video content data. This face image list display function can present, to the user, which persons appear in which time zones in the whole video content data. In addition, the face image list display function can display a list of face images of persons, with attention being paid to a predetermined attribute section included in the video content data.

FIG. 1 is a perspective view that shows the state in which a display unit of the computer 10 is opened. The computer 10 comprises a computer main body 11 and a display unit 12. A display device that is composed of a TFT-LCD (Thin Film Transistor Liquid Crystal Display) 17 is built in the display unit 12.

The display unit 12 is attached to the computer main body 11 such that the display unit 12 is freely rotatable between an open position where a top surface of the computer main body 11 is exposed, and a closed position where the top surface of the computer main body 11 is covered. The computer main body 11 has a thin box-shaped casing. A keyboard 13, a power button 14 for powering on/off the computer 10, an input operation panel 15, a touch pad 16 and speakers 18A, 18B are disposed on the top surface of the computer main body 11.

The input operation panel 15 is an input device that inputs an event corresponding to a pressed button. The input operation panel 15 has a plurality of buttons for activating a plurality of functions. The buttons include operation buttons for controlling a TV function (viewing/listening, recording, and playback of recorded broadcast program data/video data). In addition, a remote-control unit interface unit 20, which executes communication with a remote-control unit that controls the TV function of the computer 10, is provided on a front surface of the computer main body 11. The remote-control interface unit 20 is composed of, e.g. an infrared signal receiving unit.

An antenna terminal 19 for TV broadcast is provided, for example, on a right side surface of the computer main body 11. In addition, on a rear surface of the computer main body 11, there is provided an external display connection terminal corresponding to, e.g. the HDMI (high-definition multimedia interface) standard. The external display connection terminal is used to output video data (moving picture data), which is included in video content data such as broadcast program data, to an external display.

Referring now to FIG. 2, the system configuration of the computer 10 is described.

As shown in FIG. 2, the computer 10 includes a CPU 101, a north bridge 102, a main memory 103, a south bridge 104, a graphics processing unit (GPU) 105, a video memory (VRAM) 105A, a sound controller 106, a BIOS-ROM 109, a LAN controller 110, a hard disk drive (HDD) 111, a DVD drive 112, a video processor 113, a memory 113A, a wireless LAN controller 114, an IEEE 1394 controller 115, an embedded controller/keyboard controller IC (EC/KBC) 116, a TV tuner 117, and an EEPROM 118.

The CPU 101 is a processor which controls the operation of the computer 10. The CPU 101 executes an operating system (OS) 201 and various application programs such as a TV application program 202, which are loaded from the hard disk drive (HOD) 111 into the main memory 103. The TV application program 202 is software for executing the TV function. The TV application program 202 executes, for example, a live playback process for viewing/listening to broadcast program data which is received by the TV tuner 117, a recording process for recording received broadcast program data in the HDD 111, and a playback process for playing back broadcast program data/video data which is recorded in the HDD 111. The CPU 101 also executes a BIOS (Basic Input/Output System) that is stored in the BIOS-ROM 109. The BIOS is a program for hardware control.

The north bridge 102 is a bridge device that connects a local bus of the CPU 101 and the south bridge 104. The north bridge 102 includes a memory controller that access-controls the main memory 103. The north bridge 102 has a function of executing communication with the CPU 105 via, e.g. a PCI EXPRESS serial bus.

The GPU 105 is a display controller for controlling the LCD 17 that is used as a display monitor of the computer 10. A display signal, which is generated by the CPU 105, is sent to the LCD 17. In addition, the GCPU 105 can send a digital video signal to an external display device 1 via an HDMT control circuit 3 and an HDMI terminal 2.

The HDMI terminal 2 is the above-mentioned external display connection terminal. The HDMI terminal 2 can send both a non-compressed digital video signal and a digital audio signal via a single cable to the external display device 1 such as a TV. The HDMI control circuit 3 is an interface for sending the digital video signal to the external display device 1, which is called "HDMI monitor", via the HDMI terminal 2.

The south bridge 104 controls the devices on an LPC (Low Pin Count) bus, and the devices on a PCI (Peripheral Component Interconnect) bus. In addition, the south bridge 104 includes an IDE (Integrated Drive Electronics) controller for controlling the hard disk drive (HDD) 111 and DVD drive 112. The south bridge 104 also includes a function of executing communication with the sound controller 106.

Further, the video processor 113 is connected to the south bridge 104 via, e.g. a PCI EXPRESS serial bus.

The video processor 113 is a processor which executes various processes relating to the above-described video indexing, etc. The video processor 113 functions, for example, as an indexing process module for executing a video indexing process. Specifically, in the video indexing process, the video processor 113 executes a thumbnail image acquisition process. In the thumbnail image acquisition process, the video processor 113 extracts a still image of at least one frame from each of a plurality of sections which constitute a sequence of video content data. The time length of each of the sections is, for example, equal. In this case, the video processor 113 extracts a still image of at least one frame at equal time intervals from moving picture data that is included in the video content data. Needless to say, the time length of each of the sections may not necessarily be equal. For example, if the moving picture data included in the video content data is compression-encoded, only I (intra) pictures, which are intra-frame encoded pictures, may be extracted from the compression-encoded moving picture data. The each of sections of the video content data is a part of the video content data. For example, the video processor 113 may detect each cut or each scene of the moving picture data in the video content data as the section, and may extract a still image of at least one frame from each detected cut or scene.

In the video indexing process, a face image extraction process is also executed. In the face image extraction process, the video processor 113 extracts a plurality of face images from moving picture data which is included in video content data. The extraction of face images is executed, for example, by a face detection process for detecting a face region from each frame of the moving picture data, and a cut-out process (trimming process) for cutting out the detected face region from the frame. The detection of the face region can be executed, for example, by analyzing the characteristics of the image of each frame and searching for a region having characteristics similar to those of a pre-prepared face image characteristic sample. The face image characteristic sample is characteristic data which is obtained by statistically processing face image characteristics of many persons.

Further, the video processor 113 executes, for example, a process of detecting a commercial (CM) section which is included in video content data, and an audio indexing process. In usual cases, the time length of each CM section is set at one of some preset time lengths. In addition, a silent period of a predetermined time length is present before and after the CM section. Thus, in the CM section detection process, for example, audio data included in the video content data is analyzed, and a silent section of a predetermined time length is detected. A section (period), which is interposed between two successive detected silent sections and has a time length of a predetermined value or more, is detected as a CM section.

The audio indexing process is an indexing process of analyzing audio data which is included in video content data, and detecting a music section in which music is played and a talk section in which a talk is made by a person, which are included in the video content data. In the audio indexing process, for example, the characteristics of the frequency spectrum of audio data are analyzed, and the music section and talk section are detected in accordance with the characteristics of the frequency spectrum. Since the characteristic of the frequency spectrum corresponding to the music section is different from the characteristic of the frequency spectrum corresponding to the talk section, the music section and talk section can be detected by analyzing the characteristics of the frequency spectrum. In addition, a section having a frequency spectrum, in which the characteristic of the frequency spectrum corresponding to the music section and the characteristic of the frequency spectrum corresponding to the talk section are mixed, can be detected as an overlap section in which the music section and the talk section overlap.

In the process of detecting the talk section, a speaker segmentation technique or a speaker clustering technique, for instance, is used. Thereby, a change of speakers is also detected. A period in which the same speaker (or the same speaker group) talks continuously becomes one talk section.

Furthermore, the audio indexing process executes a cheer level detection process of detecting a cheer level in each partial data (data of a fixed time length) in video content data, and an excitement level detection process of detecting an excitement level in each partial data in video content data.

The cheer level is indicative of a magnitude of cheer. Cheer is a sound in which voices of many people are combined. The sound in which voices of many people are combined has a distribution of a specific frequency spectrum. In the cheer level detection process, the frequency spectrum of audio data included in video content data is analyzed, and a cheer level of each partial data is detected in accordance with an analysis result of the frequency spectrum. The excitement level is a volume level of a section in which a volume level of a certain fixed level or more occurs continuously for a predetermined time length or more. For instance, a volume level of a sound, such as relatively great applause or loud laugh, is the excitement level. In the excitement level detection process, the distribution of the volume of audio data included in video content data is analyzed, and the excitement level of each partial data is detected in accordance with the analysis result.

The memory 113A is used as a working memory of the video processor 113. A great deal of arithmetic operations is required for executing the indexing process (the CM detection process, video indexing process and audio indexing process). In the present embodiment, the video processor 113, which is a dedicated processor and differs from the CPU 101, is used as a back-end processor, and the video processor 113 executes the indexing process. Therefore, the indexing process can be executed without increasing the load on the CPU 101. Since the CM detection process can be executed by analyzing audio data, as described above, the CM detection process is treated as one of processes of the audio indexing process in the description below.

The sound controller 106 is a sound source device, and outputs audio data, which is to be played back, to the speakers 18A, 18B or to the HDMI control circuit 3.

The wireless LAN controller 114 is a wireless communication device which executes wireless communication of, e.g. IEEE 802.11 standard. The IEEE 1394 controller 115 executes communication with an external device via an IEEE 1394 serial bus.

The embedded controller/keyboard controller IC (EC/KBC) 116 is a 1-chip microcomputer in which an embedded controller for power management and a keyboard controller for controlling the keyboard (KB) 13 and touch pad 16 are integrated. The embedded controller/keyboard controller IC (EC/KBC) 116 has a function of powering on/off the computer 10 in response to the user's operation of the power button 14. Further, the embedded controller/keyboard controller IC (EC/KBC) 116 has a function of executing communication with the remote-control unit interface 20.

The TV tuner 117 is a receiving device which receives broadcast program data that is broadcast by a television (TV) broadcast signal, and is connected to the antenna terminal 19. For example, the TV tuner 117 is realized as a digital TV tuner which can receive digital broadcast program data such as ground digital TV broadcast program data. The TV tuner 117 also has a function of capturing video data which is input from an external device.

Next, referring to FIG. 3, a description is given of the indexing information display function according to the present embodiment.

The indexing process (video indexing process and audio indexing process) for video content data such as broadcast program data is executed by the video processor 113 that functions as the indexing process module, as described above.

Under the control of the TV application program 202, the video processor 113 executes the indexing process, for example, on video content data, such as recorded broadcast program data, which is designated by the user. In addition, the video processor 113 can execute, in parallel with the recording process for storing in the HDD 111 broadcast program data which is received by the TV tuner 117, the indexing process on this broadcast program data.

In the video indexing process, the video processor 113 executes a thumbnail image acquisition process. A thumbnail image is a still image (a reduced image) corresponding to each of a plurality of frames which are extracted from a plurality of sections which constitute moving picture data in video content data. Specifically, the video processor 113 extracts one or more frames from each of the sections of the moving picture data, and outputs images (thumbnail images) corresponding to the extracted frames and time stamp information TS indicative of time points at which the thumbnail images appear. The thumbnail image acquisition result data (thumbnails, time stamp information TS), which is output from the video processor 113, is stored in a database 111A as thumbnail indexing data. The database 111A is a memory area which is provided in the HOD 111 for storing indexing data.

As the time stamp information corresponding to each thumbnail image, use may be made of, for instance, an elapsed time from the start of video content data to the appearance of the frame of the thumbnail image, or the frame number of the frame of the thumbnail image.

In addition, in the video indexing process, the video processor 113 executes a process of extracting face images. The video processor 113 analyzes, in units of a frame, moving picture data that is included in video content data. The video processor 113 extracts face images of persons from a plurality of frames which constitute moving picture data, and outputs time stamp information TS indicating time points at which the extracted face images appear in the video content data. Further, the video processor 113 outputs a size (resolution) of each of the extracted face images. The face detection result data (face image, time stamp information TS, and size), which is output from the video processor 113, is stored in the database 111A as face image indexing data.

In the audio indexing process, the video processor 113 analyzes audio data which is included in the video content data, detects a plurality of kinds of attribute sections (CM section, music section, and talk section) which are included in the video content data, and outputs section attribute information which defines the time points of the start and end of each detected attribute section. The section attribute information can be composed, for example, in association with each attribute section, from time information indicative of the start time point and end time point of each attribute section. Alternatively, the section attribute information may be composed of information indicative of the start time point of the attribute section and information indicative of the time length of the attribute section.

This section attribute information is stored in the database 111A as attribute detection result information. Further, in the audio indexing process, the video processor 113 executes the above-described cheer level detection process and the excitement level detection process. The result of the cheer level detection process and the result of the excitement level detection process are also stored in the database 111A as part of the above-described attribute detection result information.

As is shown in FIG. 4, the attribute detection result information (section attribute information) is composed of, for example, a CM section table, a music section table, a talk section table and a cheer/excitement level table.

The CM section table stores CM section attribute information which is indicative of a start time point and an end time point of a detected CM section. In a case where a plurality of CM sections are present in a sequence from a start position to an end position of video content data, the CM section attribute information corresponding to these plural CM sections is stored in the CM section table. The CM section table stores start time information and end time information, which are indicative of the start time point and end time point of each of the detected CM sections.

The music section table stores music section attribute information which is indicative of a start time point and an end time point of a detected music section. In a case where a plurality of music sections are present in a sequence from a start position to an end position of video content data, the music section attribute information corresponding to these plural music sections is stored in the music section table. The music section table stores start time information and end time information, which are indicative of the start time point and end time point of each of the detected music sections.

The talk section table stores talk section attribute information which is indicative of a start time point and an end time point of a detected talk section. In a case where a plurality of talk sections are present in a sequence from a start position to an end position of video content data, the talk section attribute information corresponding to these plural talk sections is stored in the talk section table. The talk section table stores start time information and end time information, which are indicative of the start time point and end time point of each of the detected talk sections.

The cheer/excitement level table stores a cheer level and an excitement level in each partial data of a predetermined time length (time segments T1, T2, T3, . . . ) in video content data.

As is shown in FIG. 3, the TV application program 202 includes an indexing information display process module 301 for executing the above-described indexing information display function. The indexing information display process module 301 is realized, for example, as an indexing viewer program, and displays an indexing view screen for displaying an outline of the video content data, by using indexing information (e.g. face image indexing information, thumbnail indexing information, and section attribute information) stored in the database 111A.

Specifically, the indexing information display process module 301 reads out the section attribute information (CM section attribute information, music section attribute information, talk section attribute information) from the database 111A, and displays, on the indexing view screen, a section bar, which includes bar areas indicative of positions (sections from start time points to end time points) of the attribute sections (CM section, music section, talk section) in the sequence from the start position to the end position of the video content data, on the basis of the section attribute information. The section bar includes, for example, three sub-section bars, namely, a CM section bar indicative of the position of the CM section, a music section bar indicative of the position of the music section, and a talk section bar indicative of the position of the talk section.

In a case where there are a plurality of CM sections in the sequence, a plurality of bar areas indicative of the positions of the plural CM sections are displayed in the CM section bar. Similarly, in a case where there are a plurality of music sections in the sequence, a plurality of bar areas indicative of the positions of the plural music sections are displayed in the music section bar. In a case where there are a plurality of talk sections in the sequence, a plurality of bar areas indicative of the positions of the plural talk sections are displayed in the talk section bar. Hereinafter, each of the plural CM sections, which are dispersedly present in the sequence, is referred to as "partial CM section", each of the plural music sections, which are dispersedly present in the sequence, is referred to as "partial music section", and each of the plural talk sections, which are dispersedly present in the sequence, is referred to as "partial talk section".

By displaying the section bar on the indexing view screen, it becomes possible to present, to the user, in which parts of video content data the respective sections appear, and which section attributes the sections have. Thus, the user can look down upon an outline of the entire video content data, taking the section attributes into account. In the meantime, in addition to the CM section bar, music section bar and talk section bar, it is possible to display a main section bar including a bar area which is indicative of the position of a section (main section) that is other than the CM section.

In addition, the indexing information display process module 301 reads out the cheer level information and excitement level information from the database 111A, and displays, on the basis of the cheer level information and excitement level information, graphs which indicate a variation in cheer level and a variation in excitement level in the sequence from the start position to the end position of the video content data, on the level display area on the indexing view screen.

By displaying this level display area, it becomes possible to present, to the user, in which part of the video content data a section in which loud cheer occurs is present, and in which part of the video content data a section in which great excitement occurs is present. The user can view an outline of the entire video content data, by considering the section attributes, cheer level and excitement level.

For example, it is possible to use, as attribute sections, a section (cheer section) having a cheer level of a predetermined value or more and a section (excitement section) having an excitement level of a predetermined value or more. In this case, a cheer section bar including a bar area indicative of the position of the cheer section and an excitement section bar including a bar area indicative of the position of the excitement section are also displayed on the indexing view screen, together with the CM section, music section, talk section and main section bar.

The indexing information display process module 301 reads out the face image indexing information (face images, time stamp information TS, and size) from the database 111A, and displays, with use of the face image indexing information, a list of face images of persons, who appear in the video content data, on a two-dimensional display area (hereinafter referred to as "face thumbnail display area") on the indexing view screen. In this case, the indexing information display process module 301 divides a total time length of video content data into a plurality of time zones, for example, at equal time intervals, and selects a predetermined number of face images appearing in each time zone from the extracted face images. The indexing information display process module 301 arranges and displays the selected predetermined number of face images, in units of a time zone.

Specifically, the two-dimensional face thumbnail display area includes a plurality of face image display areas which are arranged in a matrix including a plurality of rows and a plurality of columns. A plurality of time zones, which constitute the total time length of the video content data, are allocated to the plural columns, respectively. To be more specific, a plurality of time zones each having the same time length, which are obtained by dividing the total time length of the video content data at equal intervals by the number of these columns, are allocated to the plurality of columns, respectively. Needless to say, the time zone allocated to each column may not necessarily have the same time length.

On the basis of the time stamp information TS corresponding to each face image, the indexing information display process module 301 displays face images, which belong to the time zone allocated to each column, on the same number of face image display areas as the number of rows belonging to each column, for example, by arranging the face images in the order of frequency of appearance of face images (in the order of detection time length of face images). In this case, for example, the same number of face images as the number of rows are selected, in the order of frequency of appearance, from the face images belonging to the time zone allocated to each column, and the selected face images are arranged from above to below in the order of frequency of appearance.

Needless to say, the face images appearing in the time zone allocated to each column may be displayed, not in the order of frequency of appearance, but in the order of appearance of face images.

By this face image list display function, it becomes possible to easily understandably present, to the user, which persons appear in which time zones in the whole video content data. Specific structure examples of the face thumbnail display area will be described later with reference to FIG. 6 and the following Figures.

In addition, the indexing information display process module 301 reads out the thumbnail indexing information (thumbnails, time stamp information TS) from the database 111A, and displays, with use of the thumbnail indexing information, the thumbnail images on a thumbnail display area (hereinafter referred to as "bellows thumbnail display area") which is disposed on one of an upper side and a lower side of the face thumbnail display area, by arranging the thumbnail images in line in the order of time of appearance.

Depending on video content data, there is a time zone in which no face image appears. Thus, by displaying the bellows thumbnail display area as well as the face thumbnail display area on the indexing view screen, it is possible to present to the user the content of video content data in the time zone in which no face image appears.

Figure 5:
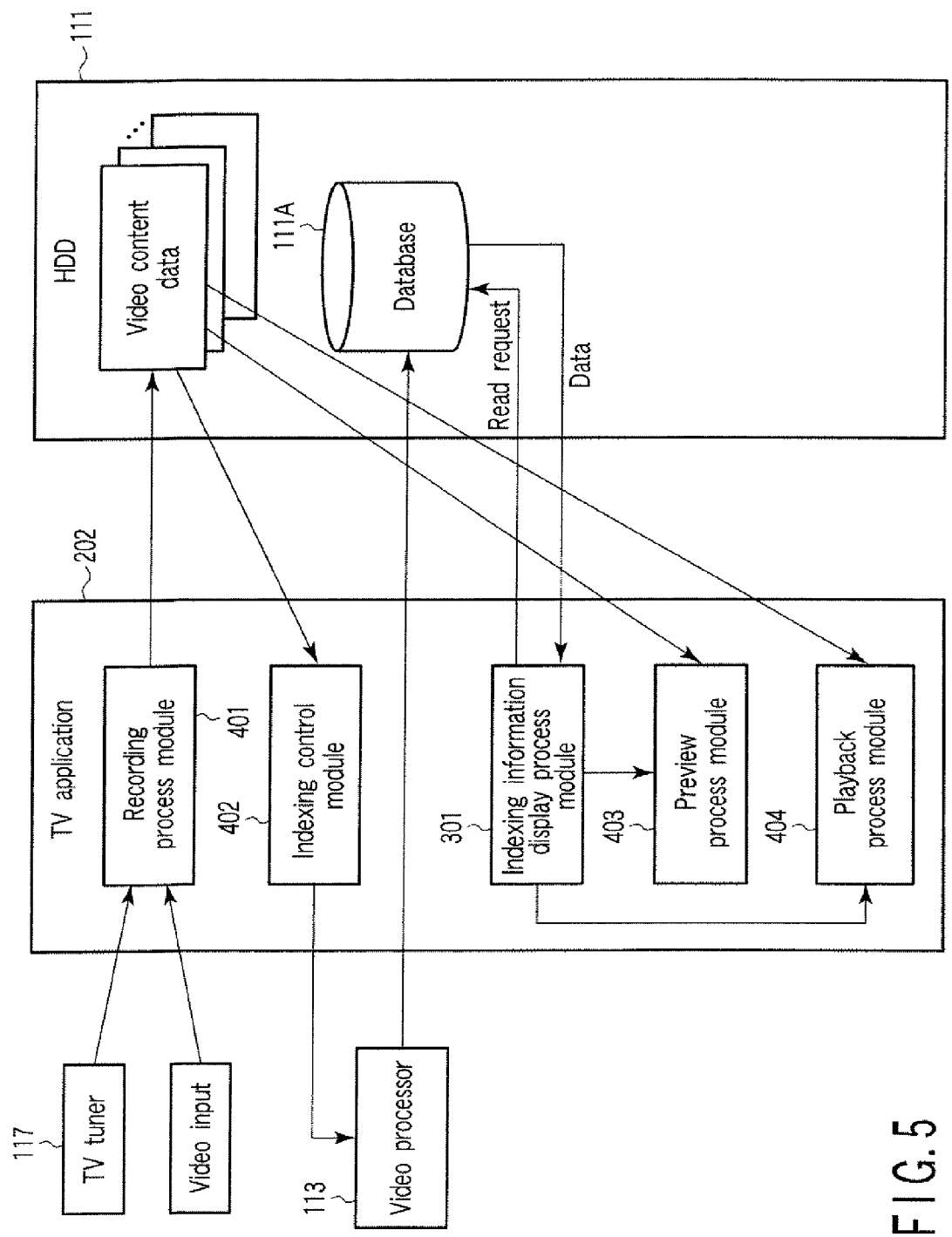
FIG. 5 is an exemplary block diagram showing the functional configuration of a program which is used in the electronic apparatus according to the embodiment.

Next, referring to FIG. 5, the functional configuration of the TV application program 202, which operates In cooperation with the indexing viewer program, is described.

The TV application program 202 includes, in addition to the above-described indexing information display process module 301, a recording process module 401, an indexing control module 402, a preview process module 403 and a playback process module 404. The indexing information display process module 301, indexing control module 402 and preview process module 403 can be realized by the indexing viewer program.

The recording process module 401 executes a recording process for recording in the HDD 111 broadcast program data which is received by the TV tuner 117 or video data which is input from an external device. In addition, the recording process module 401 executes a programmed-recording process for receiving, with use of the tuner 117, broadcast program data which is designated by programmed-recording information (channel number, date/time) that is preset by the user, and recording the received broadcast program data in the HDD 111.

The indexing control module 402 controls the video processor (indexing process module) 113 and causes the video processor 113 to execute the indexing process (video indexing process, audio indexing process). The user can designate whether the indexing process is to be executed or not, in association with each broadcast program data that is to be recorded. For example, as regards broadcast program data to be recorded, for which execution of the Indexing process has been instructed, the indexing process is automatically started after the broadcast program data is recorded in the HDD 111. Besides, the user may designate video content data, from among the video content data already stored in the HDD 111, for which the indexing process is to be executed.

When (simple) playback (preview playback) of an arbitrary attribute section in video content data is requested by the user, the preview process module 403 executes, on the indexing view screen, the (simple) playback (preview playback) of moving picture data of the video content data, which belongs to the arbitrary attribute section. The user can designate a part, of which the preview playback is to be executed, by using the above-described section bar. Specifically, if a bar area on the section bar (CM section bar, music section bar, talk section bar, main section bar, cheer section bar, excitement section bar) is selected by the user's operation of the remote-control unit, keyboard, mouse, etc., the preview playback of the attribute section, which corresponds to the selected bar area, is executed.

The preview playback can be executed on an arbitrary display area on the indexing view screen. In the present embodiment, for example, the preview playback can be executed by using the above-described bellows thumbnail display area. As has been described above, the plural still images (thumbnail images), which are displayed on the bellows thumbnail display area, are still images which are extracted from plural sections of the video content data. Thus, each still image (thumbnail image) displayed on the bellows thumbnail display area corresponds a certain section (a certain time period) in the video content data. In other words, a certain section in the video content data is allocated to each still image (thumbnail image) displayed on the bellows thumbnail display area. When an event of requesting playback of moving picture data of a certain attribute section is input, the preview process module 403 first specifies a section, which belongs to the attribute section whose playback is requested, from among the plural sections corresponding to the thumbnail images on the bellows thumbnail display area, and then specifies an Image display position on the bellows thumbnail display area, where the thumbnail image extracted from the specified section is displayed. At the specified image display position, the preview process module 403 executes (simple) playback (preview playback) of moving picture data in the attribute section, the playback of which is requested.

Specifically, in usual cases, plural thumbnail images are displayed on the bellows thumbnail display area in the order of time. However, at the time of preview playback, the image display position corresponding to the thumbnail image, which is extracted from the moving picture data belonging to the attribute section that is the object of playback, is used for the preview playback of this moving picture data. The image display position, which is used for the preview playback, is movable on the bellows thumbnail display area in accordance with the progress of playback of moving picture data. For example, in a case where a first section and a second section, which are continuous, belong to an attribute section that is designated by the user, playback of moving picture data of video content data, which belongs to the first section, is executed at the image display position on the bellows thumbnail display area, where the thumbnail image extracted from the first section is displayed. If the playback of the moving picture data of the video content data belonging to the first section is finished, the image display position, which is used for the playback of the moving picture data of the video content data belonging to the designated attribute section, is changed to the image display position on the bellows thumbnail display area, where the thumbnail image extracted from the second section is displayed. The playback of moving picture data of video content data, which belongs to the second section, is executed at the changed image display position, that is, at the image display position on the bellows thumbnail display area, where the thumbnail image extracted from the second section is displayed.

The playback process module 404 executes a process for playing back each video content data, which is stored in the HDD 111, on a screen (window) which is different from the indexing view screen. In addition, the playback process module 404 has such a function that when a playback instruction event is input by a user operation in the state in which one of face images in the face image list of certain video content data is selected, the playback process module 404 starts playback of the video content data from a time point that is a predetermined time before a time point at which the selected face image appears.

The indexing process may not necessarily be executed by the video processor 113. For example, the TV application program 202 may be provided with a function of executing the indexing process. In this case, the indexing process is executed by the CPU 101 under the control of the indexing viewer program or the TV application program 202.

Figure 7:
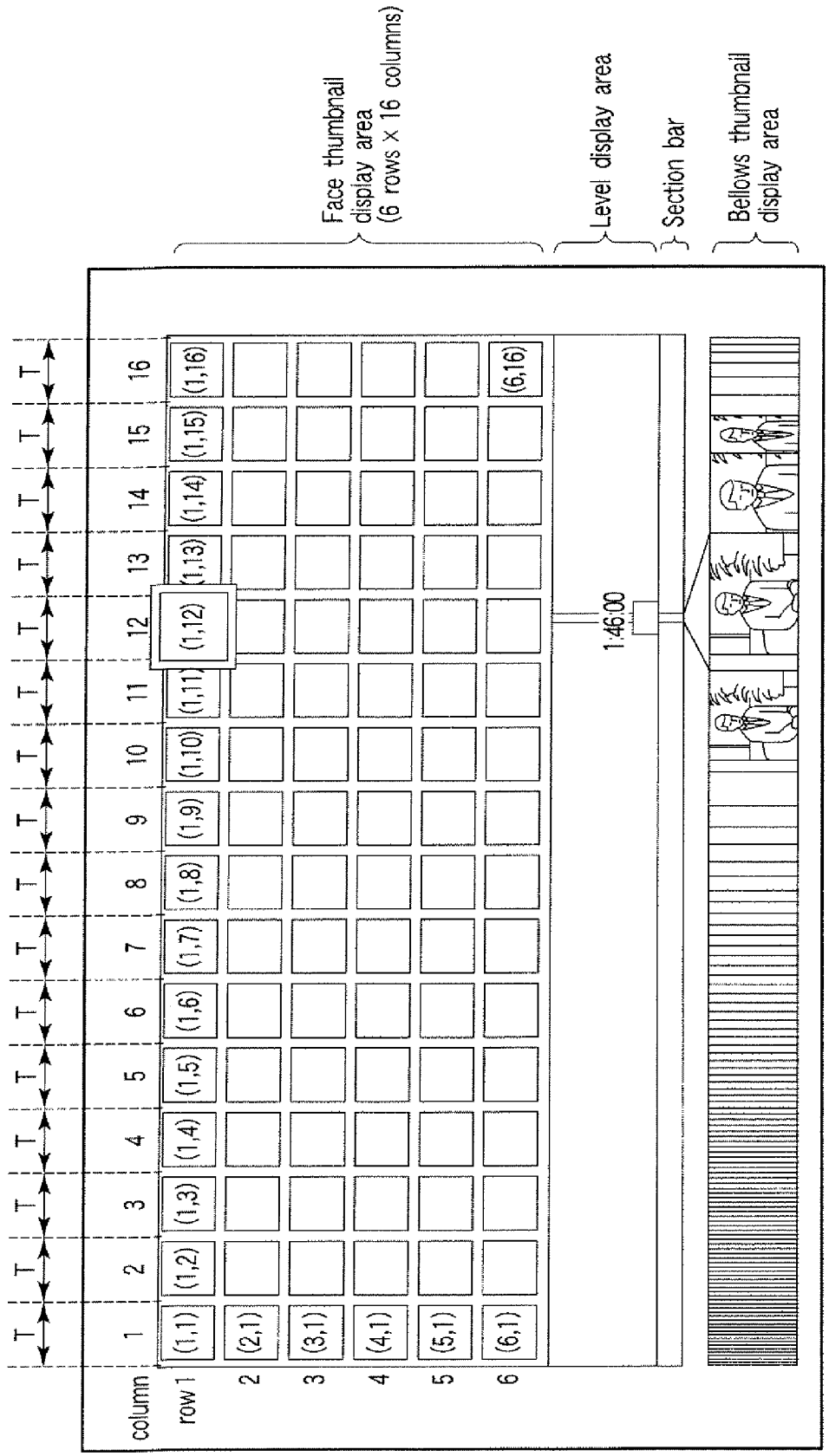
FIG. 7 shows a structure example of a face thumbnail display area which is included in the indexing view screen shown in FIG. 6.

Next, referring to FIG. 6 to FIG. 8, specific structures of the indexing view screen are described.

FIG. 6 shows an example of an indexing view screen which is displayed on the LCD 17 by the indexing information display process module 301. The indexing view screen is a screen which is obtained by subjecting certain video content data (e.g. broadcast program data) to the indexing process. The indexing view screen includes the above-described face thumbnail display area for displaying the list of face images, the above-described level display area, the above-described section bar, and the above-described bellows thumbnail display area for displaying the list of thumbnail images in a bellows format.

The term "bellows format", in this context, is a display format in which a selected thumbnail image is displayed in a normal size and other thumbnail images are displayed in laterally reduced sizes.

Specifically, the indexing information display process module 301 displays the thumbnail image, which is selected by the user operation, with a first lateral width size, and displays each of the other thumbnail images with a smaller lateral width size than the first lateral width size. In FIG. 6, a thumbnail image, which has a greater distance from the selected thumbnail image, is more reduced in its lateral size. In other words, the selected thumbnail image is displayed with a normal size, thumbnail images near the selected thumbnail image are displayed with reduced lateral widths, and the other thumbnail images are displayed with small lateral widths. A rectangular frame may be added to the selected thumbnail image.

One of thumbnail images on the bellows thumbnail display area can be selected by a user operation (a button of the remote-control unit, a cursor key, etc.).

The level display area displays a graph (a graph shown in a dense color in FIG. 6) indicating a variation of the cheer level, and a graph (a graph shown in a light color in FIG. 6) indicating a variation of the excitement level.

The section bar includes, for instance, a talk section bar, a music section bar and a CM section bar. In the CM section bar, a bar area (a black strip area in FIG. 6) is displayed at a position of each CM section (each partial CM section). In the music section bar, a bar area (a cross-hatched strip area in FIG. 6) is displayed at a position of each music section (each partial music section). In the talk section bar, a bar area (a hatched strip area in FIG. 6) is displayed at a position of each talk section (each partial talk section). The user can select any one of the talk section bar, music section bar and CM section bar by operating a button of the remote-control key, or an upward, downward, leftward or rightward cursor key of the keyboard 13. In addition, the user can also select a bar area in the selected section bar by operating the button of the remote-control key, or the upward, downward, leftward or rightward cursor key.

FIG. 7 shows an example of the structure of the face thumbnail display area.

The face thumbnail display area includes a plurality of face image display areas which are arranged in a matrix including a plurality of rows and a plurality of columns in FIG. 7, the face thumbnail display area comprises 6 rows×16 columns. The number of face image display areas included in the face thumbnail display area is 96.

A plurality of time zones, each of which has the same time length T that is obtained by dividing the total time length of video content data (moving picture data included in video content data) by the number of columns (=16) at equal time intervals, are allocated to columns 1 to 16, respectively.

For example, if the total time length of video content data is two hours, the two hours are divided into 16 time zones at equal time intervals. In this case, the time length T of each time zone is 7.5 minutes. For example, a time zone from 0:00:00 (the beginning) to 0:07:30 is allocated to column 1, a time zone from 0:07:30 to 0:15:00 is allocated to column 2, and a time zone from 0:15:00 to 0:22:30 is allocated to column 3. The time length T of each time zone varies in accordance with the total time length of video content data.

Needless to say, the length of the time zone, which is allocated to each of the plural columns, may not necessarily be equal.

On the basis of time stamp information corresponding to face images which are extracted by the video processor 113, the indexing information display process module 301 displays the face images, which belong to the time zone allocated to each column, on the six face image display areas of the associated column by arranging the face images, for example, in the above-described order of frequency. In this case, the indexing information display process module 301 selects face images, the number of which is equal to the number of rows (six), from the face images that belong to the time zone allocated to the column that is the object of the display process, and arranges and displays the selected face images, the number of which is equal to the number of rows.

As has been described above, in the face thumbnail display area, use is made of a time axis having a base point at a left end position (1, 1) and an end point of video content data at a right end position (6, 16).

The user can select the size of the face image, which is displayed on each face image display area of the face thumbnail display area, from among "large", "medium" and "small". The number of rows and the number of columns are varied in accordance with the size of the face Image which is selected by the user. The relationship between the size of the face image and the numbers of rows and columns is as follows.

(1) "large": 3 rows×8 columns
(2) "medium": 6 rows×16 columns
(3) "small": 10 rows×24 columns.

In the case of "large", each face image is displayed with a size of, e.g. 180×180 pixels. In the case of "medium", each face image is displayed with a size of, e.g. 90×90 pixels. In the case of "small", each face image is displayed with a size of, e.g. 60×60 pixels. The default face image size is set at, for example, "medium".

Each face image in the face thumbnail display area is set in one of two states, namely, a non-selected "standard" state and a selected "focus" state. The size of the face image in the "focus" state is set to be greater than the size (180×180, 90×90, or 60×60) of the face image in the "standard" state. FIG. 7 shows the case in which the face image at coordinates (1, 12) is in the "focus" state.

The number of thumbnail images, which are displayed in the bellows thumbnail display area, is set at one of 240, 144, 96 and 48 in accordance with the user setting. The default value is, e.g. 240. In this case, moving picture data is divided into 240 sections (240 time zones), and 240 thumbnail images, which are extracted from the 240 sections, are arranged in the order of time and displayed on the bellows thumbnail display area.

The thumbnail image is set in one of two states, namely, a non-selected "standard" state and a selected "focus" state. The size of the thumbnail image in the "focus" state is set to be greater than the size of the other thumbnail images.

Next, referring to FIG. 8, the relationship between the face thumbnail display area and the bellows thumbnail display area is described.

A set of face image display areas belonging to the same column, that is, each column in the face thumbnail display area, is referred to as "large section", Each of divisions of the "large section" is referred to as "small section", The number of small sections included in one large section is given by a quotient of the number of thumbnail images displayed in the bellows thumbnail display area, which are divided by the number of columns of the face thumbnail display area. For example, if the face thumbnail display area has a size of 6 rows×16 columns and the number of thumbnail images displayed in the bellows thumbnail display area is 240, the number of small sections included in one large section is 15 (=240÷16). One large section includes 15 small sections. In other words, 15 thumbnail images belong to the time zone corresponding to one large section.

When a certain thumbnail image on the bellows thumbnail display area is selected, the indexing information display process module 301 selects, on the basis of time stamp information of the selected thumbnail image, a column (large section) from plural columns (plural large sections) in the face thumbnail display area, to which the time zone to which the selected thumbnail image belongs is allocated. The selected large section is a large section which includes a section (small section) to which the selected thumbnail image belongs. The indexing information display process module 301 displays the selected large section with emphasis.

Further, the indexing information display process module 301 displays a vertical bar which connects the selected thumbnail image and the selected large section. The vertical bar is used in order to indicate to which of the 15 small sections, which are included in the selected large section, the small section corresponding to the selected thumbnail image corresponds. The vertical bar is displayed at the position of that small section of the 15 small sections included in the selected large section, which corresponds to the selected thumbnail image. For example, if the selected thumbnail image is the first image of the 15 thumbnail images belonging to the time zone corresponding to a certain large section, that is, the image corresponding to the first small section of the large section, the selected thumbnail image is connected to the left end of the large section by the vertical bar. On the other hand, for example, if the selected thumbnail image is the last image of the 15 thumbnail images belonging to the time zone corresponding to a certain large section, that is, the image corresponding to the last small section of the large section, the selected thumbnail image is connected to the right end of the large section by the vertical bar.

As has been described above, when a thumbnail image on the bellows thumbnail display area is selected, a column (large section), to which the time zone to which the selected thumbnail image belongs is allocated, is automatically selected from a plurality of columns in the face thumbnail display area. Thereby, the user can recognize to which of columns (large sections) in the face thumbnail display area the selected thumbnail image corresponds. Further, by the vertical bar, the user can also recognize to which time point in which column (large section) the selected thumbnail image corresponds.

Furthermore, the indexing information display process module 301 displays, on the basis of the time stamp information of the selected thumbnail image, the time information on the indexing view screen, which indicates the time point at which the selected thumbnail image appears.

A "present position change" button is an operation button for changing a thumbnail image which is selected. If the user operates a left cursor key or a right cursor key in the state in which the "present position change" button is focused, the thumbnail image to be selected is shifted to the left or right, for example, in units of one small section.

Figure 9:
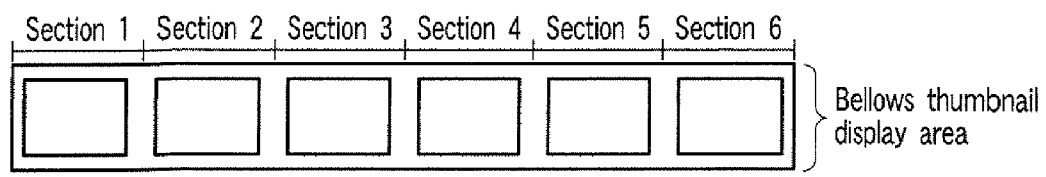
FIG. 9 shows an example of the bellows thumbnail display area which is included in the indexing view screen shown in FIG. 6.

The "bellows" format may not necessarily be used for the display of thumbnail images on the bellows thumbnail display area. For example, as shown in FIG. 9, a plurality thumbnail images may be arranged and displayed with the same size. In FIG. 9, moving picture data is divided into six sections (6 small sections), and six thumbnail images belonging to sixth sections 1 to 6 are arranged and displayed on the bellows thumbnail display area.

Next, referring to FIG. 10 to FIG. 13, a preview playback process, which is executed on the bellows thumbnail display area, is described.

Figure 10:
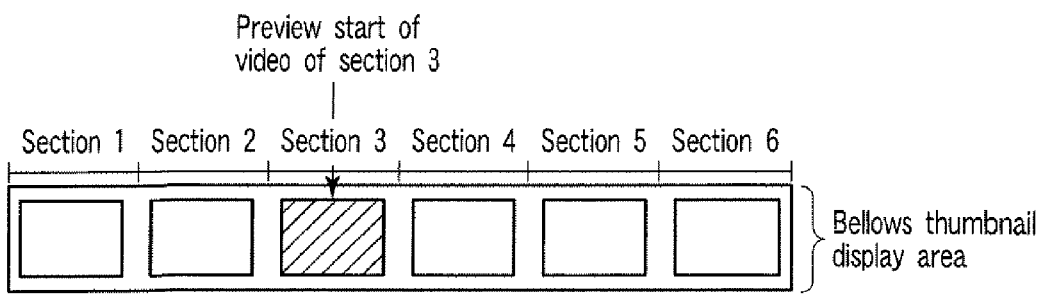
FIG. 10 shows a state in which preview playback is executed with use of the bellows thumbnail display area shown in FIG. 9.

FIG. 10 shows a state in which preview playback is executed on the bellows thumbnail display area which has been described with reference to FIG. 9. In the case where the attribute section that is selected by the user operation is the section 3, or in the case where the first section of several sections, which belong to the selected attribute section, is the section 3, the image display position on the bellows thumbnail display area, at which the thumbnail image belonging to the section 3 is displayed, is specified as the preview playback position. The preview playback of the moving picture data from the section 3, that is, the preview playback of the moving picture data belonging to the selected attribute section, is started on the image display position of the thumbnail image belonging to the section 3.

If the thumbnail image of the section 3, which is displayed on the bellows thumbnail display area, is the still image of the first frame in the section 3, the preview playback of the moving picture data is started from the time point at which the thumbnail image of the displayed section 3 appears. If the thumbnail image of the section 3, which is displayed on the bellows thumbnail display area, is the still image of a frame at an intermediate position in a plurality of frames in the section 3, the preview playback of the moving picture data is started from the first frame in the section 3. Needless to say, regardless of whether the thumbnail image of the section 3, which is displayed on the bellows thumbnail display area, is the first frame in the section 3 or not, the preview playback of the moving picture data may be set to be started from the time point at which the thumbnail image of the displayed section 3 appears.

For example, if the sections 3, 4, 5 and 6 belong to the attribute section that is selected by the user, the preview playback of the moving picture data of not only the section 3 but also the preview playback of the moving picture data of the following sections 4, 5 and 6 can be executed on the image display position of the thumbnail image belonging to the section 3.

In the case where the attribute section that is selected by the user operation is the section 1, or in the case where the first section of several sections, which belong to the selected attribute section, is the section 1, the preview playback of the moving picture data of the selected attribute section is started on the image display position of the thumbnail image belonging to the section 1. Similarly, in the case where the attribute section that is selected by the user operation is the section 4, or in the case where the first section of several sections, which belong to the selected attribute section, is the section 4, the preview playback of the moving picture data of the selected attribute section is started on the image display position of the thumbnail image belonging to the section 4.

Figure 11:
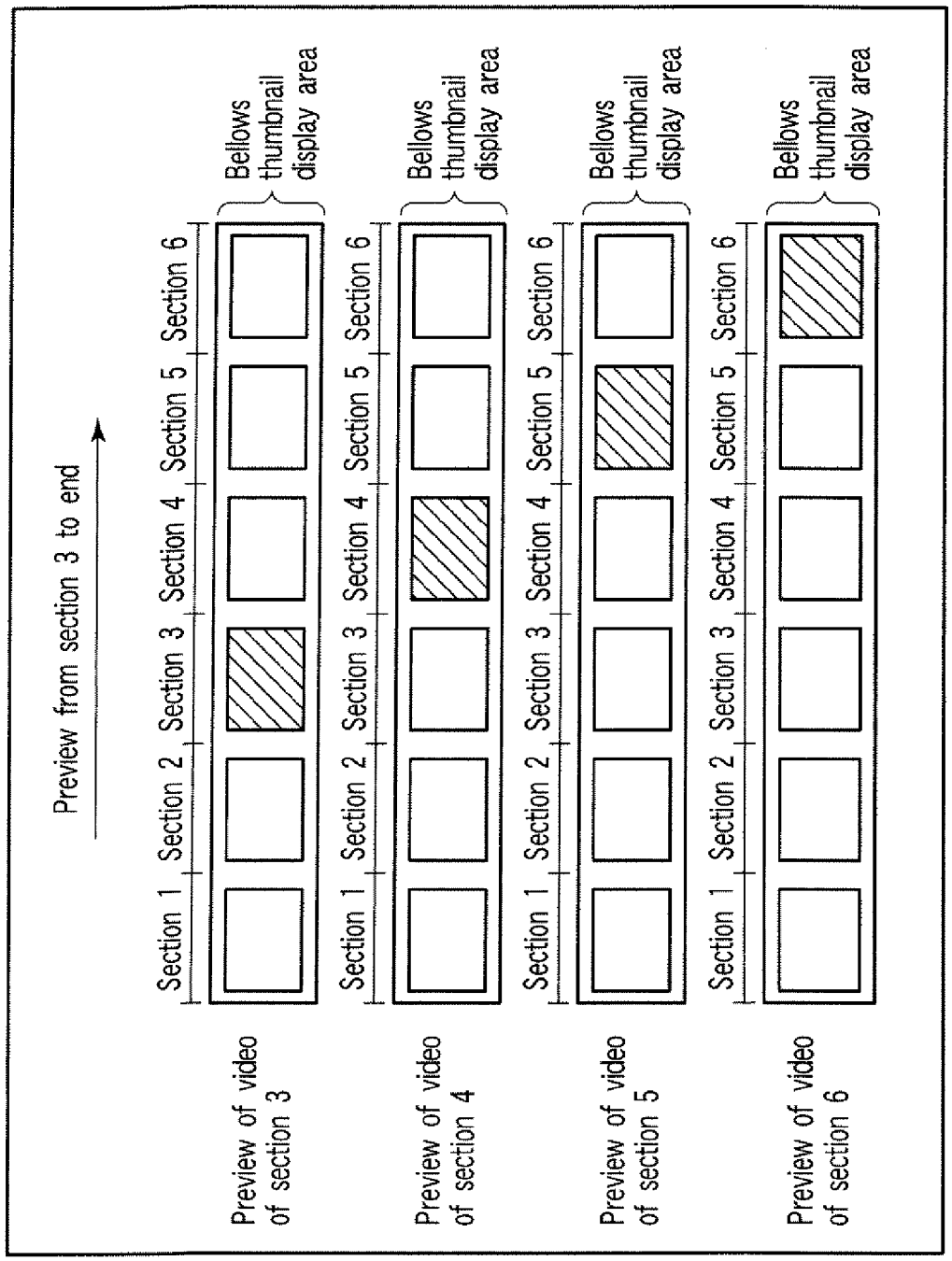
FIG. 11 shows a state in which a preview playback image display position moves on the bellows thumbnail display area shown in FIG. 9.

FIG. 11 shows an example in which the image display position, which is used for preview playback, is automatically changed in accordance with the change of the section that is the object of preview playback.

For example, in the case where the attribute section, which is selected by the user operation, includes the sections 3 to 6, the image display position of the thumbnail image belonging to the section 3 is specified as the preview playback position. The preview playback of the moving picture data from the section 3 is started on the image display position of the thumbnail image belonging to the section 3. Then, when the section that is to be played back shifts from the section 3 to section 4 with the progress of the preview playback process, the image display position, which is used for preview playback, is changed to the image display position of the thumbnail image belonging to the section 4. Thus, the preview playback of the moving picture data of the section 4 is started on the image display position of the thumbnail image belonging to the section 4.

Subsequently, when the section that is to be played back shifts from the section 4 to section 5 with the progress of the preview playback process, the image display position, which is used for preview playback, is changed to the image display position of the thumbnail image belonging to the section 5. Thus, the preview playback of the moving picture data of the section 5 is started on the image display position of the thumbnail image belonging to the section 5.

Further, when the section that is to be played back shifts from the section 5 to section 6 with the progress of the preview playback process, the image display position, which is used for preview playback, is changed to the image display position of the thumbnail image belonging to the section 6. Thus, the preview playback of the moving picture data of the section 6 is started on the image display position of the thumbnail image belonging to the section 6.

As has been described above, in the present embodiment, the image display position on the bellows thumbnail display area, which is used for preview playback, is automatically changed in accordance with the progress of the preview playback. Thereby, the moving picture data of the section that is the object of preview playback can always be displayed on the image display position corresponding to the thumbnail image which is extracted from the section that is the object of preview playback. Therefore, during the preview playback process, it is possible to present in real time, to the user, to which part of the entire video content data the moving picture data, which is currently being played back for preview, corresponds.

Figure 12:
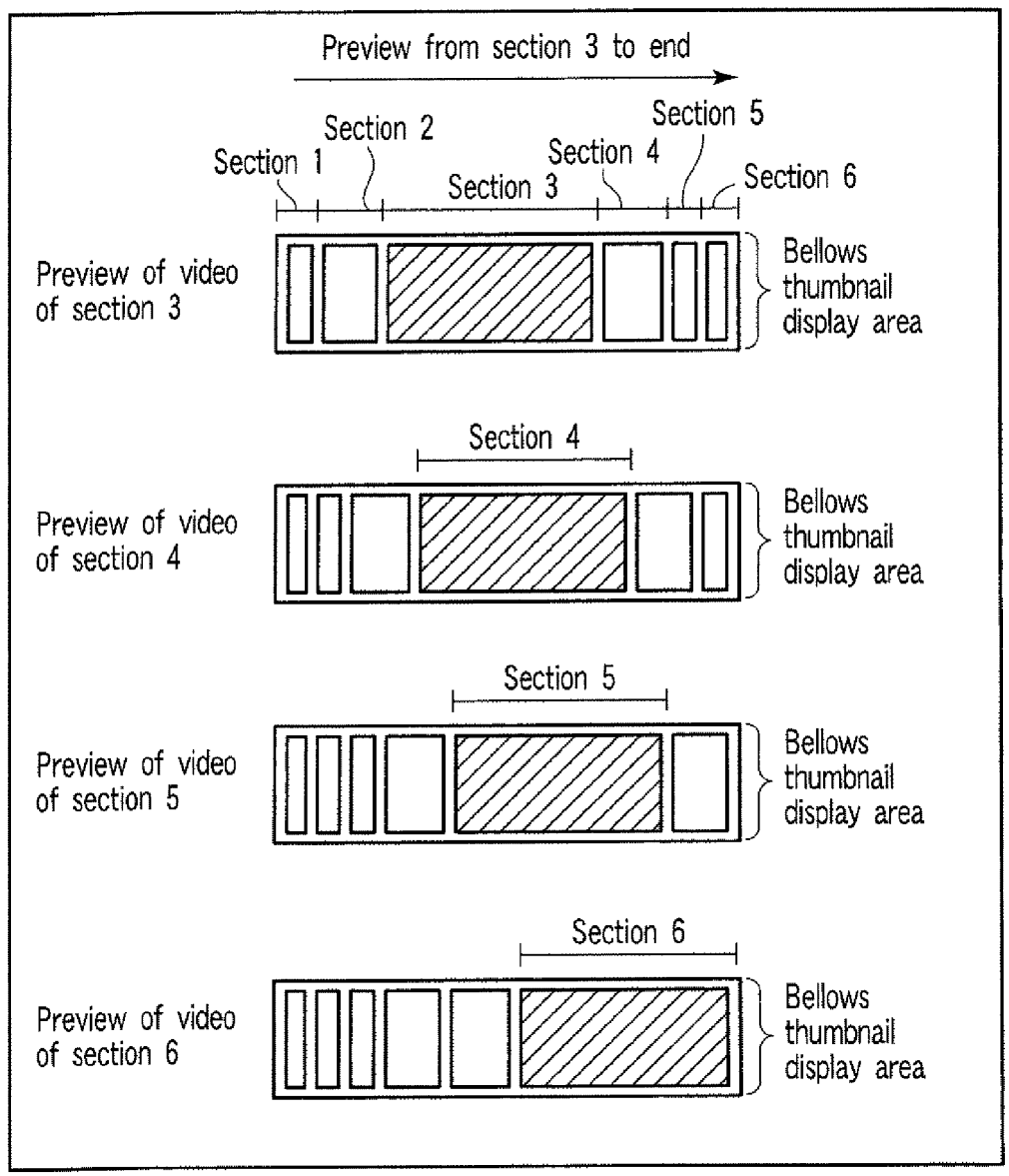
FIG. 12 shows a state in which preview playback is executed with use of the image display position of a selected thumbnail image on the bellows thumbnail display area which is included in the indexing view screen shown in FIG. 6.

FIG. 12 shows an example of the case of executing preview playback with use of bellows-format display.

For example, in the case where the attribute section, which is selected by the user operation, includes the sections 3 to 6, the image display position of the thumbnail image belonging to the section 3 is specified as the preview playback position. In this case, the thumbnail image belonging to the section 3 is selected from among the plural thumbnail images on the bellows thumbnail display area, and the thumbnail image belonging to the section 3 is enlarged to the normal size. Then, the preview playback of the moving picture data from the section 3 is started on the image display position (enlarged thumbnail image display area) of the thumbnail image belonging to the section 3. Thereafter, when the section that is to be played back shifts from the section 3 to section 4 with the progress of the preview playback process, the thumbnail image belonging to the section 4 is selected, and the image display position, which is used for preview playback, is changed to the image display position of the thumbnail image belonging to the section 4. The thumbnail image belonging to the selected section 4 is enlarged to the normal size. Thus, the preview playback of the moving picture data of the section 4 is started on the image display position (enlarged thumbnail image display area) of the thumbnail image belonging to the section 4.

Subsequently, when the section that is to be played back shifts from the section 4 to section 5 with the progress of the preview playback process, the thumbnail image belonging to the section 5 is selected, and the image display position, which is used for preview playback, is changed to the image display position of the thumbnail image belonging to the section 5. The thumbnail image belonging to the selected section 5 is enlarged to the normal size. Thus, the preview playback of the moving picture data of the section 5 is started on the image display position (enlarged thumbnail image display area) of the thumbnail image belonging to the section 5.

Thereafter, when the section that is to be played back shifts from the section 5 to section 6 with the progress of the preview playback process, the thumbnail image belonging to the section 6 is selected, and the image display position, which is used for preview playback, is changed to the image display position of the thumbnail image belonging to the section 6. The thumbnail image belonging to the selected section 6 is enlarged to the normal size. Thus, the preview playback of the moving picture data of the section 6 is started on the image display position (enlarged thumbnail image display area) of the thumbnail image belonging to the section 6.

In the preview playback of the moving picture data of the selected attribute section, a plurality of still images, which are extracted from the moving picture data of this attribute section, may be set to be successively displayed at predetermined time intervals. In this case, in the video indexing process, still images of a plurality of frames in each section (each small section) may be extracted.

Figure 13:
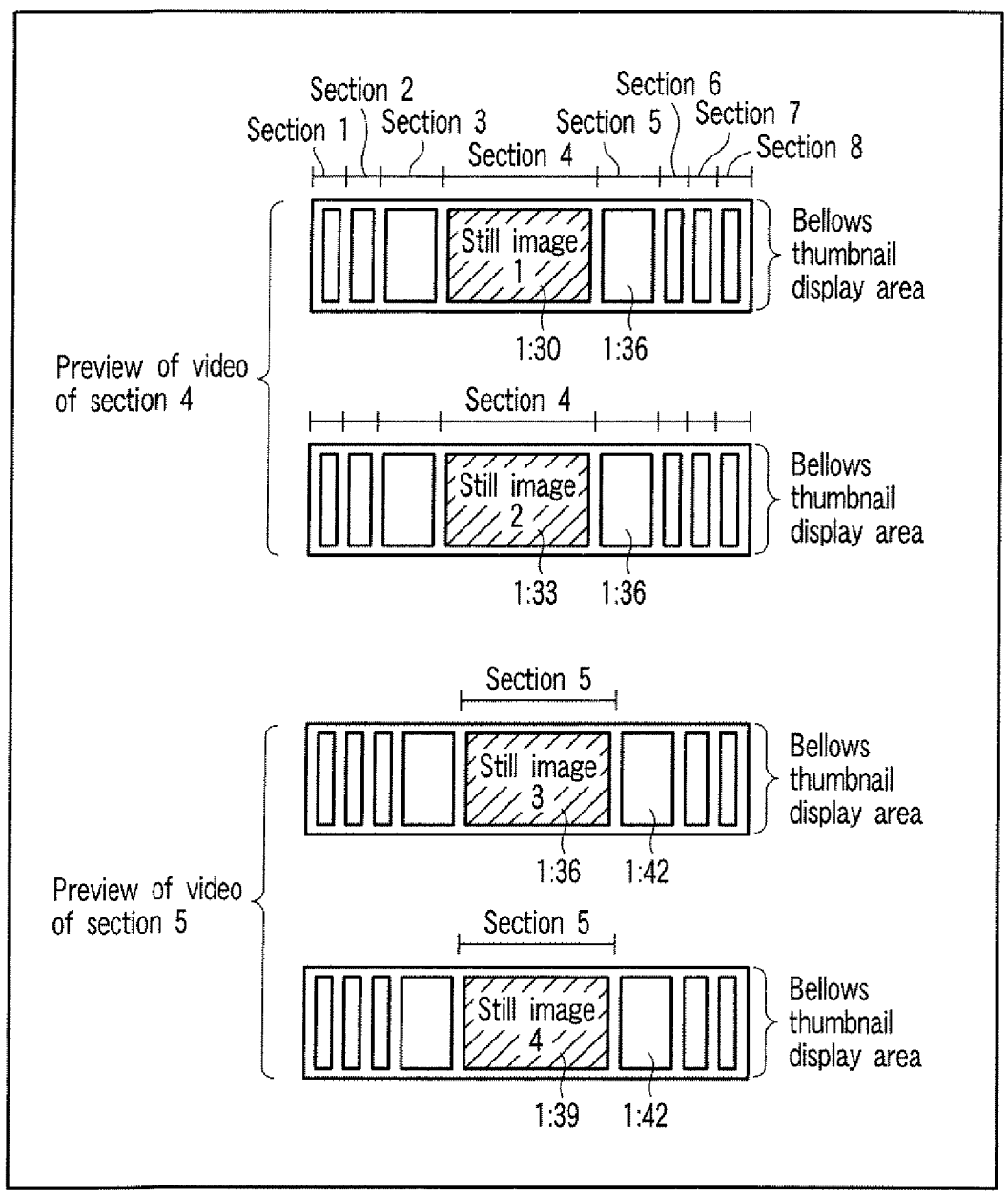
FIG. 13 shows an example of the case in which a preview playback process, which is executed by the electronic apparatus according to the embodiment, is carried out by successively displaying a plurality of still images.

FIG. 13 shows an example of the case of executing the preview playback of the selected attribute section by using a plurality of still images which are extracted from this attribute section.

In FIG. 13, it is assumed that the thumbnail image on the bellows thumbnail display area, which corresponds to the section 4, is a still image of a frame at one minute and 30 seconds from the beginning of the moving picture data, and that the thumbnail image on the bellows thumbnail display area, which corresponds to the section 5, is a still image of a frame at one minute and 36 seconds from the beginning of the moving picture data.

In the case of executing the preview playback of the section 4 and section 5, the still image (still image 1) at the time point of one minute and 30 seconds is first displayed on the image display position corresponding to the still image at the time point of one minute and 30 seconds. Subsequently, a still image (still image 2) at a time point of, e.g. one minute and 33 seconds is displayed on the same image display position. The still image 2 is a still image which is positioned at a middle point between the still image at the time point of one minute and 30 seconds and the still image at the time point of one minute and 36 seconds.

Subsequently, the still image at the time point of one minute and 36 seconds, which belongs to the section 5, is selected, and the image display position which is used for preview playback is changed to the image display position of the still image at the time point of one minute and 36 seconds. The still image (still image 3) at the time point of one minute and 36 seconds is displayed on the changed image display position, and then a still image (still image 4) at a time point of, e.g. one minute and 39 seconds is displayed on the same image display position. The still image 4 is a still image which is positioned at a middle point between the still image at the time point of one minute and 36 seconds and a still image at a time point of one minute and 42 seconds, which is displayed at a position corresponding to the next section 6.

Figure 14:
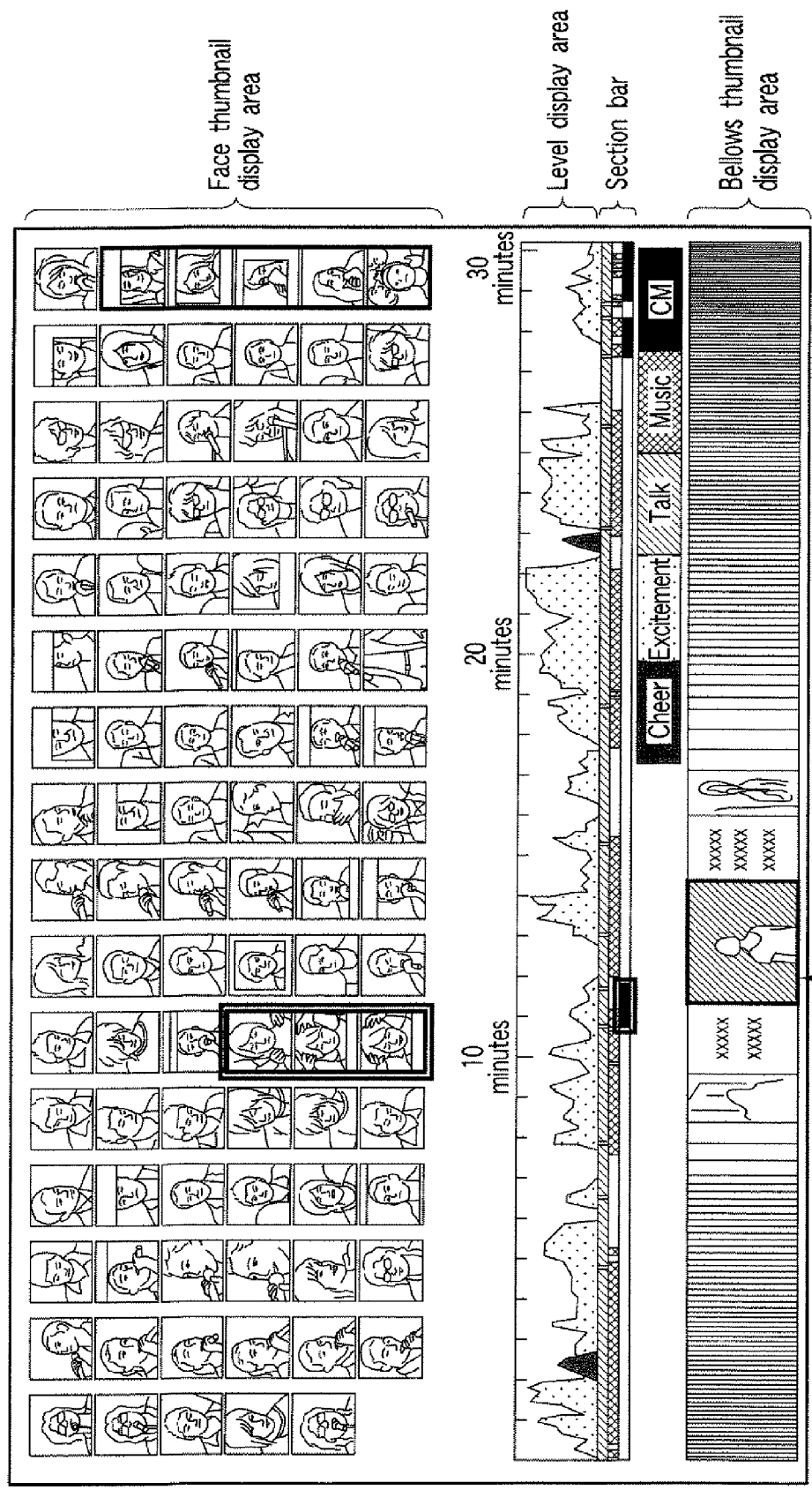
FIG. 14 shows an example of the indexing view screen in a case where a CM section is selected on the indexing view screen shown in FIG. 6.

FIG. 14 shows an example of the indexing view screen corresponding to the case in which one bar area in the CM section bar is selected. In FIG. 14, the selected bar area in the CM section bar is displayed in the state in which the selected bar area is enclosed in a box.

If one bar area in the CM section bar is selected by the user, the preview playback of the moving picture data, which belongs to the CM section (selected CM section) corresponding to the selected bar area, is executed, for example, on the image display position on the bellows thumbnail display area, where the thumbnail image extracted from the selected CM section is displayed. In addition, not only the preview playback of the CM section corresponding to the selected bar area, but also the preview playback of the moving picture data belonging to all CM sections may be executed. For example, in a case where a first partial CM section and a second partial CM section are dispersedly present in the sequence of video content data, the preview process module 403 first executes, on the basis of the CM section attribute information, the preview playback of the moving picture data, which belongs to the first partial CM section, for example, on the image display position on the bellows thumbnail display area, where the thumbnail image extracted from the first partial CM section is displayed. If the preview playback of the moving picture data belonging to the first partial CM section is finished, the preview process module 403 skips preview playback of the moving picture data of other sections between the first partial CM section and second partial CM section, and executes preview playback of the moving picture data, which belongs to the second partial CM section, for example, on the image display position on the bellows thumbnail display area, where the thumbnail image extracted from the second partial CM section is displayed.

The order of preview playback of the respective partial CM sections may be different. For example, in the case where the selected bar area corresponds to the second partial CM section, the preview process module 403 first executes the preview playback of the moving picture data belonging to the second partial CM section, for example, on the image display position on the bellows thumbnail display area, where the thumbnail image extracted from the second partial CM section is displayed. If the preview playback of the moving picture data belonging to the second partial CM section is finished, the preview process module 403 then executes the preview playback of the moving picture data belonging to the first partial CM section, for example, on the image display position on the bellows thumbnail display area, where the thumbnail image extracted from the first partial CM section is displayed.

The indexing information display process module 301 detects the face images belonging to the CM section (selected CM section) corresponding to the selected bar area and the face images belonging to the other CM sections. In addition, the indexing information display process module 301 displays the face images belonging to the selected CM section, for example, in the state in which these face images are encircled in a double-line box, and displays the face images belonging to the other CM sections, for example, in the state in which these face images are encircled in a single-line box. The method of display is not limited to these examples. For example, the face images encircled in the box may be displayed with emphasis (e.g. enlargement, brightening), and the other face images may be displayed with dimming (e.g. reduction in size, darkening, lightening). Alternatively, marks may be added to corners of the face images, or only the face images enclosed in a box may be displayed while the other face images being excluded from display.

When a part other than the bar area in the CM section bar is selected by the user, preview playback of the moving picture data belonging to the section (main section) other than the CM section may be executed.

Figure 15:
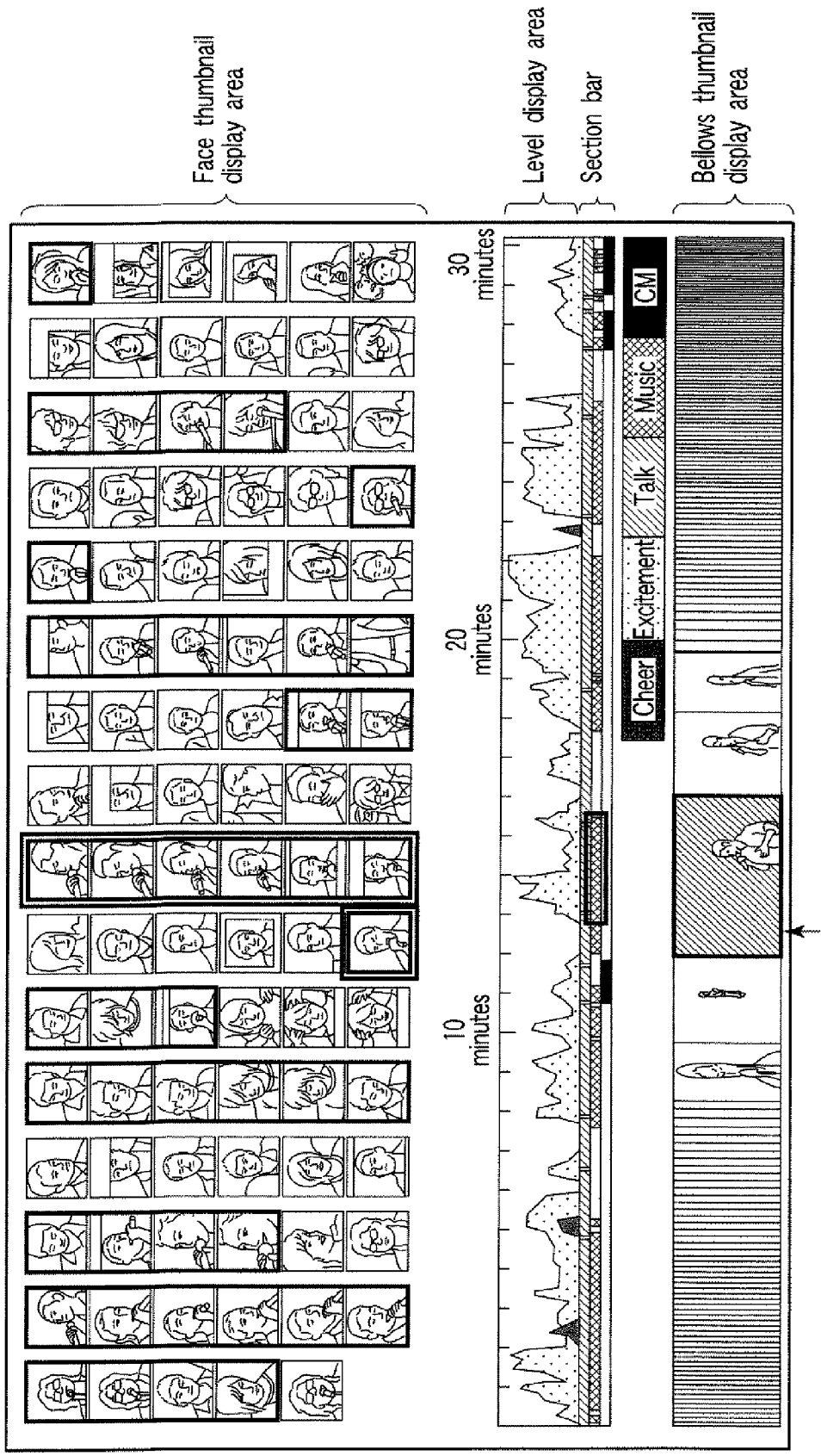
FIG. 15 shows an example of the indexing view screen in a case where a music section is selected on the indexing view screen shown in FIG. 6.

FIG. 15 shows an example of the indexing view screen corresponding to the case in which one bar area in the music section bar is selected. In FIG. 15, the selected bar area is displayed in the state in which the selected bar area is enclosed in a box.

If one bar area in the music section bar is selected by the user, the preview playback of the moving picture data, which belongs to the music section (selected music section) corresponding to the selected bar area, is executed, for example, on the image display position on the bellows thumbnail display area, where the thumbnail image extracted from the selected music section is displayed. In addition, not only the preview playback of the music section corresponding to the selected bar area, but also the preview playback of the moving picture data belonging to all music sections may be executed. In this case, the preview process module 403 executes (1) a process of detecting each music section from all sections including CM sections, or (2) a process of detecting each music section from the main section excluding CM sections. The detection process (2) can be executed, for example, on the basis of the CM section attribute information and the music section attribute information. The preview playback of the moving picture data belonging to each music section, which is detected by the process (1) or (2), is executed. In this case, preview playback of a section, which intervenes between a certain music section and the next music section, is skipped.

For example, in a case where a first partial music section and a second partial music section are dispersedly present in the sequence of video content data, the preview process module 403 first executes, on the basis of the music section attribute information, the preview playback of the moving picture data belonging to the first partial music section, for example, on the image display position on the bellows thumbnail display area, where the thumbnail image extracted from the first partial music section is displayed. If the preview playback of the moving picture data belonging to the first partial music section is finished, the preview process module 403 skips preview playback of other sections between the first partial music section and second partial music section, and executes preview playback of the moving picture data, which belongs to the second partial music section, for example, on the image display position on the bellows thumbnail display area, where the thumbnail image extracted from the second partial music section is displayed.

The order of preview playback of the respective partial music sections may be different. For example, in the case where the selected bar area corresponds to the second partial music section, the preview process module 403 first executes the preview playback of the moving picture data belonging to the second partial music section, for example, on the image display position on the bellows thumbnail display area, where the thumbnail image extracted from the second partial music section is displayed. If the preview playback of the moving picture data belonging to the second partial music section is finished, the preview process module 403 then executes the preview playback of the moving picture data belonging to the first partial music section, for example, on the image display position on the bellows thumbnail display area, where the thumbnail image extracted from the first partial music section is displayed.

The indexing information display process module 301 detects the face images belonging to the music section (selected music section) corresponding to the selected bar area and the face images belonging to the other music sections. In addition, the indexing information display process module 301 displays the face images belonging to the selected music section, for example, in the state in which these face images are encircled in a double-line box, and displays the face images belonging to the other music sections, for example, in the state in which these face images are encircled in a single-line box. The method of display is not limited to these examples. For example, the face images encircled in the box may be displayed with emphasis (e.g. enlargement, brightening), and the other face images may be displayed with dimming (e.g. reduction in sizer darkening, lightening). Alternatively, marks may be added to corners of the face images, or only the face images enclosed in a box may be displayed while the other face images being excluded from display.

When a part other than the bar area in the music section bar is selected by the user, preview playback of the moving picture data belonging to all sections other than the music section may be executed.

FIG. 16 shows an example of the indexing view screen corresponding to the case in which one bar area in the talk section bar is selected. In FIG. 16, the selected bar area is displayed in the state in which the selected bar area is enclosed in a box.

If one bar area in the talk section bar is selected by the user, the preview playback of the moving picture data, which belongs to the talk section (selected talk section) corresponding to the selected bar area, is executed on the image display position on the bellows thumbnail display area, where the thumbnail image extracted from the selected talk section is displayed. In addition, not only the preview playback of the talk section corresponding to the selected bar area, but also the preview playback of the moving picture data belonging to all talk sections may be executed. In this case, the preview process module 403 executes (1) a process of detecting each talk section from all sections including CM sections, or (2) a process of detecting each talk section from the main section excluding CM sections. The detection process (2) can be executed, for example, on the basis of the CM section attribute information and the talk section attribute information. The preview playback of the moving picture data belonging to each talk section, which is detected by the process (1) or (2), is executed. In this case, preview playback of a section, which intervenes between a certain talk section and the next talk section, is skipped.

For example, in a case where a first partial talk section and a second partial talk section are dispersedly present in the sequence of video content data, the preview process module 403 first executes, on the basis of the talk section attribute information, the preview playback of the moving picture data belonging to the first partial talk section, for example, on the image display position on the bellows thumbnail display area, where the thumbnail image extracted from the first partial talk section is displayed. If the preview playback of the moving picture data belonging to the first partial talk section is finished, the preview process module 403 skips preview playback of other sections between the first partial talk section and second partial talk section, and executes preview playback of the moving picture data, which belongs to the second partial talk section, for example, on the image display position on the bellows thumbnail display area, where the thumbnail image extracted from the second partial talk section is displayed.

The order of preview playback of the respective partial talk sections may be different. For example, in the case where the selected bar area corresponds to the second partial talk section, the preview process module 403 first executes the preview playback of the moving picture data belonging to the second partial talk section, for example, on the image display position on the bellows thumbnail display area, where the thumbnail image extracted from the second partial talk section is displayed. If the preview playback of the moving picture data belonging to the second partial talk section is finished, the preview process module 403 then executes the preview playback of the moving picture data belonging to the first partial talk section, for example, on the image display position on the bellows thumbnail display area, where the thumbnail image extracted from the first partial talk section is displayed.

The indexing information display process module 301 detects the face images belonging to the talk section (selected talk section) corresponding to the selected bar area and the face images belonging to the other talk sections. In addition, the indexing information display process module 301 displays the face images belonging to the selected talk section, for example, in the state in which these face images are encircled in a double-line box, and displays the face images belonging to the other talk sections, for example, in the state in which these face images are encircled in a single-line box. The method of display is not limited to these examples. For example, the face images encircled in the box may be displayed with emphasis (e.g. enlargement, brightening), and the other face images may be displayed with dimming (e.g. reduction in size, darkening, lightening). Alternatively, marks may be added to corners of the face images, or only the face images enclosed in a box may be displayed while the other face images being excluded from display.

When a part other than the bar area in the talk section bar is selected by the user, preview playback of the moving picture data belonging to all sections other than the talk section may be executed.

Figure 17:
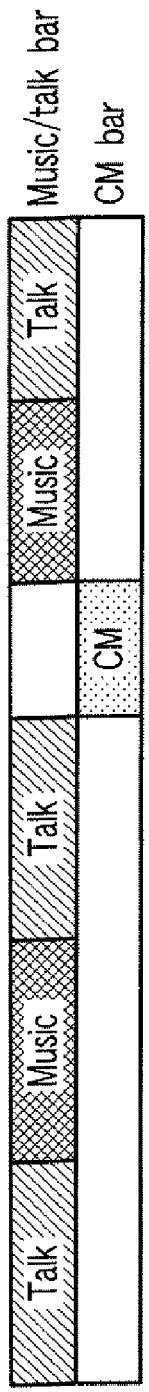
FIG. 17 shows an example of a section bar which is displayed on the indexing view screen shown in FIG. 6.

FIG. 17 shows another structure example of the section bar.

In FIG. 17, the section bar comprises two sub-section bars, namely, a music/talk section bar and a CM section bar. The CM section bar indicates the position of a CM section. The music/talk section bar indicates the position of a music section and the position of a talk section in the section (main section) other than the CM section. In the case where the CM section bar is selected by the user, the moving picture data belonging to the CM section is detected, and the preview playback of the detected moving picture data is executed. In the case where the music/talk section bar is selected by the user, the moving picture data belonging to the main section is detected, and the preview playback of the detected moving picture data is executed. In the case where a talk bar area in the music/talk section bar is selected by the user, the moving picture data belonging to the talk section corresponding to the selected talk bar area is detected, and the preview playback of the detected moving picture data is executed. Furthermore, in the case where a music bar area in the music/talk section bar is selected by the user, the moving picture data belonging to the music section corresponding to the selected music bar area is detected, and the preview playback of the detected moving picture data is executed.

Figure 18:
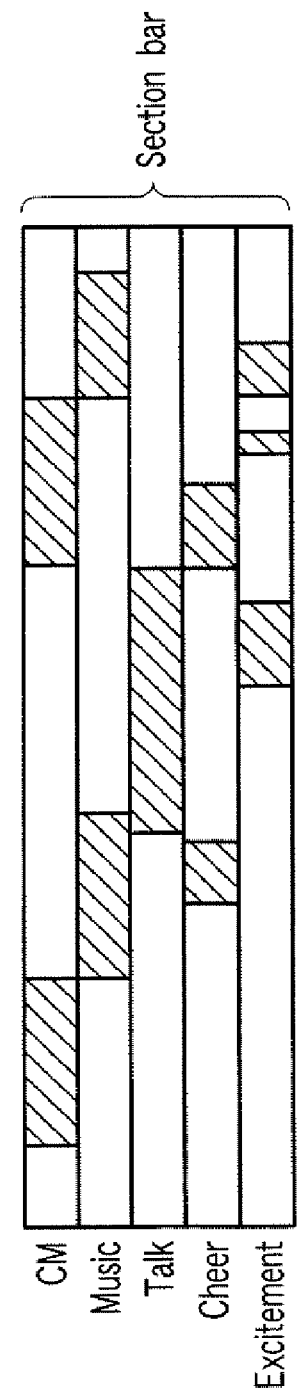
FIG. 18 shows another example of the section bar which is displayed on the indexing view screen shown in FIG. 6.

FIG. 18 shows still another structure example of the section bar.

In FIG. 18, the section bar is composed of five sub-section bars, namely, a CM section bar, a music section bar, a talk section bar, a cheer section bar and an excitement section bar.

If one bar area in the cheer section bar is selected by the user, the preview playback of the moving picture data, which belongs to the cheer section (selected cheer section) corresponding to the selected bar area, is executed on the image display position on the bellows thumbnail display area, where the thumbnail image extracted from the selected cheer section is displayed. In addition, not only the preview playback of the cheer section corresponding to the selected bar area, but also the preview playback of the moving picture data belonging to all cheer sections may be executed. In this case, the preview process module 403 executes (1) a process of detecting each cheer section from all sections including CM sections, or (2) a process of detecting each cheer section from the main section excluding CM sections. The preview playback of the moving picture data belonging to each cheer section, which is detected by the process (1) or (2), is executed. In this case, preview playback of a section, which intervenes between a certain cheer section and the next cheer section, is skipped.

If one bar area in the excitement section bar is selected by the user, the preview playback of the moving picture data, which belongs to the excitement section (selected excitement section) corresponding to the selected bar area, is executed on the image display position on the bellows thumbnail display area, where the thumbnail image extracted from the selected excitement section is displayed. In addition, not only the preview playback of the excitement section corresponding to the selected bar area, but also the preview playback of the moving picture data belonging to all excitement sections may be executed. In this case, the preview process module 403 executes (1) a process of detecting each excitement section from all sections including CM sections, or (2) a process of detecting each excitement section from the main section excluding CM sections. The preview playback of the moving picture data belonging to each excitement section, which is detected by the process (1) or (2), is executed. In this case, preview playback of a section, which intervenes between a certain excitement section and the next excitement section, is skipped.

In addition to the above-described five sub-section bars (CM section bar, music section bar, talk section bar, cheer section bar and excitement section bar), a main section bar including a bar area indicative of the position of the main section may be displayed.

Since the sections, which are other than the CM section, constitute the main section, the CM section bar may be used as a sub-section bar which is indicative of both the CM section and the main section.

FIG. 19 shows another example of the indexing view screen.

A preview area for displaying moving picture data, which is played back for preview, is disposed on the indexing view screen. The preview playback of the moving picture data of the video content data, which belongs to a predetermined attribute section designated by the user, is executed on the preview area.

Next, referring to a flow chart of FIG. 20, a description is given of the procedure of the indexing screen display process which is executed by the indexing viewer program.

To start with, the indexing information display process module 301 sorts face images that are stored in the database 111A, on the basis of time stamp information corresponding to these face images, in an order of time of appearance of the face images (step S101). Then, the indexing information display process module 301 determines the number of rows and the number of columns in accordance with a face image size to be displayed, which is designated by the user, and calculates a time zone which is allocated to each column (large section), by equally dividing the total time length of video content data, which is an object of indexing, by the number of columns Then, the indexing information display process module 301 selects that number of face images, which is equal to the number of rows, from the face images belonging to the time zone which is allocated to the column that is the object of the display process (step S102).

Subsequently, the indexing information display process module 301 displays selected face images on a plurality of face image display areas in the column that is the object of the display process, for example, by arranging the face images in the order of frequency of appearance (step S103). A face image with a higher frequency of appearance is displayed on a more upward face image display area.

The process of steps S102 and S103 is repeatedly executed until the processing on all columns is completed, with the number of the column that is the object of the display process being updated (step S104, S105).

If the number of face images belonging to the time zone, which is allocated to the column that is the object of the display process, is less than the number of rows, thumbnail images belonging to the corresponding time zone may also be displayed in the column that is the object of the display process.

If the process on all columns is completed (NO in step S104), the indexing information display process module 301 displays the thumbnail images, which are stored in the database 111A, on the bellows thumbnail display area on the basis of the time stamp information of the thumbnail images, by arranging the thumbnail images in line in the order of time of appearance of the thumbnail images (step S106).

Thereafter, the indexing information display process module 301 reads out the cheer level information and excitement level information from the database 111A, and displays, on the level display area, a graph which indicates a variation in cheer level in the sequence from the start position to the end position of the video content data, and a graph which indicates a variation in excitement level in the sequence, in accordance with the cheer level information and excitement level information (step S107).

Subsequently, the indexing information display process module 301 reads out the CM section attribute information, music section attribute information and talk section attribute information from the database 111A, and displays the CM section bar, music section bar and talk section bar on the basis of the CM section attribute information, music section attribute information and talk section attribute information (step S108). The CM section bar displays the bar area which is indicative of the position of the CM section. Similarly, the music section bar displays the bar area which is indicative of the position of the music section, and the talk section bar displays the bar area which is indicative of the position of the talk section.

Thereafter, if execution of preview playback of a certain attribute section (CM section, music section, talk section, or main section other than the CM section) is requested by a user operation (YES in step S109), the preview process module 403 executes the preview playback of the moving picture data of the attribute section, of which the playback is requested, for example, on the bellows thumbnail display area (step S110). In step S110, the preview process module 403 first specifies a small section corresponding to the attribute section, of which the playback is requested, from among a plurality of small sections corresponding to a plurality of thumbnail images displayed on the bellows thumbnail display area (e.g. a first small section of a plurality of small sections belonging to the attribute section, of which the playback is requested). Then, the preview process module 403 specifies the image display position on the bellows thumbnail display area, where the thumbnail image extracted from the specified small bock is displayed. The preview process module 403 starts the preview playback of the moving picture data of the attribute section, of which the playback is requested, on the specified image display position on the bellows thumbnail display area. In other words, the image display position on the bellows thumbnail display area, where the first thumbnail image of the thumbnail images extracted from the attribute section, of which the playback is requested, becomes the image display position at which the preview playback is executed. The played-back moving picture data is displayed on the specified image display position of the bellows thumbnail display area.

The preview playback may be executed in response to the selection of a bar area in a certain section bar by the user.

Besides, when a bar area in a certain section bar is selected by the user, it is possible to execute, at the same time as the preview playback, a process of displaying each face image belonging to the attribute section corresponding to the selected bar area and each face image belonging to the other attribute sections in such a manner that these face images are distinguished from each other. In this case, the indexing information process unit 301 classifies, on the basis of the section attribute information indicative of the predetermined attribute section corresponding to the selected bar area and the time stamp information corresponding to each of the plurality of face images included in the face image indexing information, the plurality of face images into a first face image group belonging to the predetermined attribute section and a second face image group belonging to the sections other than the predetermined attribute section, and displays, on the face thumbnail display area, the face images belonging to one group of the first face image group and the second face image group in such a manner that the face images belonging to the one group are distinguished from the face images belonging to the other group of the first face image group and the second face image group. For example, if the bar area of the CM section is selected by the user, the preview playback of the CM section is executed, for example, on the bellows thumbnail display area, and the face images belonging to the CM section are displayed on the face thumbnail display area in the state in which the face images belonging to the CM section are distinguished from the face images belonging to the main section. In this case, only the face images belonging to the CM section may be displayed, and the face images belonging to the main section may not be displayed.

Figure 21:
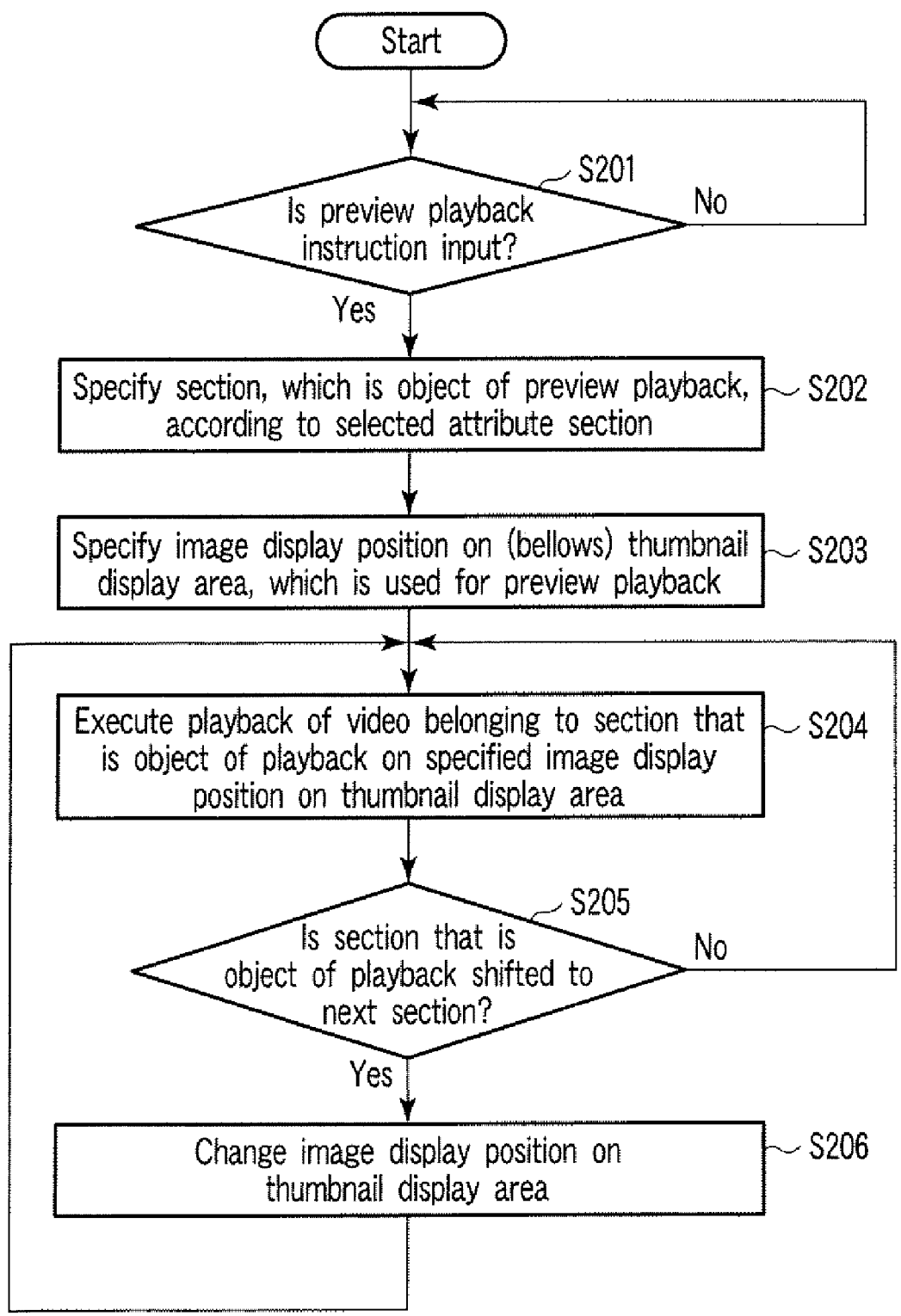
FIG. 21 is an exemplary flow chart illustrating the procedure of a preview process which is executed by the electronic apparatus according to the embodiment.

Next, referring to a flow chart of FIG. 21, a specific example of the procedure of the preview playback process is described.

If the start of preview playback is instructed by the user's operation of the remote-control unit, mouse, keyboard, etc., an event (preview playback instruction) of requesting preview playback is input to the indexing viewer program. When the preview playback instruction is input (YES in step S201), the preview process module 403 specifies the section (the section that is the object of preview playback) of which preview playback is to be executed, in accordance with the bar area of the section bar, which is selected by the user (step S202).

Then, the preview process module 403 specifies the image display position on the bellows thumbnail display area, which is used for the preview playback, on the basis of the time stamp information of each of the thumbnail images displayed on the bellows thumbnail display area, and the section attribute information which defines the start and end time points of the attribute section designated by the selected bar area (step S203). In step S203, the preview process module 403 specifies a small section, which belongs to the designated attribute section, from among a plurality of small sections corresponding to a plurality of thumbnail images displayed on the bellows thumbnail display area (e.g. a first small section of a plurality of small sections belonging to the designated attribute section), and then specifies the image display position on the bellows thumbnail display area, where the thumbnail image extracted from the specified small bock is displayed. Then, the preview process module 403 executes the preview playback of the moving picture data, which belongs to the designated attribute section, on the specified image display position (step S204).

During the execution of the preview playback, the preview process module 403 determines whether a timing has come, at which the small section that is the object of preview playback shifts to the next small section with the progress of the preview playback (step S205). If the timing, at which the small section that is the object of preview playback shifts to the next small section, has come, the preview process module 403 changes the image display position on the bellows thumbnail display area, which is used for the playback of the moving picture data, to the image display position on the bellows thumbnail display area, where a newly selected thumbnail image is displayed (step S206). The preview process module 403 executes, on the changed image display position, the preview playback of the moving image data of the next small section (step S204).

As has been described above, in the present embodiment, by displaying the section bar, it becomes possible to present, to the user, at which positions in the video content data the respective kinds of attribute sections appear. In addition, since the preview playback of an arbitrary attribute section can be executed, for example, by the user's selecting operation of the section bar, the content of the video content data can be presented to the user, with attention being paid not to the entire video content data, but to a specific attribute section in the video content data. Thus, the user can look down upon an outline of the video content data, for example, by paying attention to the CM section in the video content data or to the section (main section) other than the CM section. In addition, the user can take a bird's-eye view of the video content data by paying attention to other attribute sections (music, talk, cheer, excitement, main section, etc.).

In the present embodiment, since the preview playback can be executed on the bellows thumbnail display area, there is no need to provide a dedicated preview area on the indexing view screen. In addition, since the preview playback is executed on the bellows thumbnail display area corresponding to the thumbnail image which is extracted from the attribute section that is the object of preview playback, the user can easily understand to which part of the video content data the moving picture data, which is currently played back for preview, corresponds, simply by viewing the bellows thumbnail display area.

Furthermore, in the present embodiment, the image display position on the bellows thumbnail display area, which is used for preview playback, is automatically changed in accordance with the progress of the preview playback. Thereby, the moving picture data of the section that is the object of preview playback can always be displayed on the image display position corresponding to the thumbnail image which is extracted from the section that is the object of preview playback. Therefore, during the preview playback process, it is possible to present in real time, to the user, to which part of the entire video content data the moving picture data, which is currently being played back for preview, corresponds In the present embodiment, the indexing information (face image indexing information, section attribute information, etc.) is generated by the video processor 113 which functions as the indexing process module. However, for example, in the case where broadcast program data includes, in advance, indexing information corresponding to the broadcast program data, this indexing information can be utilized. If there is complete indexing information that is necessary, there is no need to execute the indexing process. Accordingly, the indexing information display function and the preview function of the present embodiment can also be realized by only the database 111A and the indexing viewer program (the indexing information display process module 301 and preview process module 403).

In the present embodiment, the case of using a plurality of kinds of attribute sections has been exemplified. Alternatively, the embodiment may adopt such a structure that only one specific attribute section, such as a CM section, is used.

In the present invention, a section, which satisfies a certain specific condition, can be detected by combining two or more arbitrary attribute sections of a plurality of kinds of attribute sections (CM section, main section, music section, talk section, cheer section and excitement section) according to conditions such as NOT/AND/OR. In this case, the user can designate two or more arbitrary attribute sections, for example, by using the section bar, and the user can designate the conditions, such as NOT/AND/OR, which are to be applied to the two or more arbitrary attribute sections, by using, for example, a menu displayed on the indexing view screen. By providing the indexing viewer program with the function of prompting the user to designate the two or more arbitrary attribute sections and the conditions, such as NOT/AND/OR, which are to be applied to the two or more arbitrary attribute sections, the indexing viewer program is able to specify the section that is the object of preview playback, on the basis of the section attribute information of the designated two or more arbitrary attribute sections, and the designated conditions such as NOT/AND/OR.

In the present embodiment, a description has been given of the example in which the time information indicative of the start time point and the time information indicative of the end time point are used as the section attribute information. However, it should suffice if the section attribute information is information which specifies the start and end time points of each section. Thus, the information indicative of the start point of the section and the information indicative of the time length of the section may be used as the section attribute information.

The procedures of the indexing information display process and the preview process of the present embodiment can all be realized by software. Therefore, by installing the software in an ordinary computer via a computer-readable memory medium, the same advantageous effects as in the present embodiment can easily be realized.

The electronic apparatus of the present embodiment can be realized by not only the computer 10, but also by various consumer electronic apparatuses such as an HDD recorder, a DVD recorder and a TV apparatus. In this case, the functions of the indexing information display process and the preview process can be realized by hardware such as a DSP or a microcomputer.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A display method for displaying an outline of video content data, comprising:

executing an indexing process of analyzing audio data included in the video content data, and outputting, based on a result of the analyzing the audio data, section attribute information which specifies a start time point and an end time point of at least one predetermined attribute section of a plurality of attribute sections;

extracting still images from the video content data;

displaying, on a predetermined display area on a display screen, the extracted still images by arranging the extracted still images in line in an order of time of appearance of the extracted still images, such that a still image selected from the extracted still images is displayed with a first lateral width size and each of the other still images is displayed with a smaller lateral width size than the first lateral width size;

displaying, on the display screen, a section bar including a bar area which is indicative of a position of the predetermined attribute section in a sequence of the video content data, on the basis of the section attribute information;

specifying an image display position on the predetermined display area, where the still image extracted from the predetermined attribute section is displayed; and starting playback of moving picture data of the predetermined attribute section in the video content data, on the specified image display position on the predetermined display area, such that the moving picture data of the predetermined attribute section is displayed with the first lateral width size on the specified image display position, in a case where an event of requesting playback of the video content data of the predetermined attribute section is input.

2. The display method according to claim 1, wherein: the extracting including extracting a still image of at least one frame from each of a plurality of sections which constitute the sequence of the video content data.

3. The display method according to claim 1, wherein the extracting includes extracting a still image of at least one frame from each of a plurality of sections which constitute the sequence of the video content data; and wherein said executing the playback of the moving picture data includes executing, in a case where a first section and a second section, which are continuous in the plurality of sections, belong to the predetermined attribute section, the playback of the moving picture data in the video content data, which belongs to the first section, on an image display position on the predetermined display area, where the still image extracted from the first section is displayed, changing, when the section that is an object of playback shifts from the first section to the second section with a progress of playback of the moving picture data, the image display position on the display area, which is used for the playback of the moving picture data in the video content data which belongs to the predetermined attribute section, to an image display position on the predetermined display area, where the still image extracted from the second section is displayed, and executing the playback of the moving picture data in the video content data of the second section on the changed image display position.

4. The display method of claim 1, wherein the plurality of attribute sessions include a commercial section, a section other than the commercial section, a music section in which music is played, a talk section in which a talk is made by a person, a cheer section having a cheer level of a predetermined value or more and an excitement section having an excitement level of a predetermined value or more, which are included in the video content data.

5. An electronic apparatus comprising:
an indexing module configured to execute an indexing process of analyzing audio data included in video content data, and to output, based on a result of the analyzing the audio data, section attribute information which specifies a start time point and an end time point of at least one predetermined attribute section of a plurality of attribute sections;
a still image display module configured to extract still images from the video content data, and to display, on a predetermined display area on a display screen, the extracted still images by arranging the extracted still images in line in an order of time of appearance of the extracted still images, the still image display module being configured to display a still image selected from the extracted still images with a first lateral width size and to display each of the other still images with a smaller lateral width size than the first lateral width size;
a display process module configured to display, on the display screen, a section bar including a bar area which is indicative of a position of the predetermined attribute section in a sequence of the video content data, on the basis of the section attribute information; and
a playback process module configured to specify an image display position on the predetermined display area, where the still image extracted from the predetermined attribute section is displayed, and to start playback of moving picture data of the predetermined attribute section in the video content data, on the specified image display position on the predetermined display area, such that the moving picture data of the predetermined attribute section is displayed with the first lateral width size on the specified image display position in a case where an event of requesting playback of the video content data of the predetermined attribute section is input.

6. The electronic apparatus according to claim 5, wherein the section attribute information includes, in a case where the section attribute information includes a plurality of partial sections which are dispersedly present in the sequence of the video content data, information which specifies a start time point and an end time point of each of the plurality of partial sections, and
the display process module is configured to arrange, in the section bar, a plurality of bar areas which are indicative of positions of the plurality of partial sections in the sequence of the video content data.

7. The electronic apparatus according to claim 6, wherein the display process module is configured to start, in a case where one of the plurality of bar areas is selected by a user, playback of moving picture data in the video content data, which belongs to a partial section corresponding to the selected bar area.

8. The electronic apparatus according to claim 5, wherein the section attribute information includes, in a case where the predetermined attribute section includes a first partial section and a second partial section which are dispersedly present in the sequence of the video content data, information which specifies a start time point and an end time point of each of the first partial section and the second partial section, and
the playback process module is configured to start playback of the moving picture data in the video content data, which belongs to the first partial section, according to the section attribute information, and to start, after the playback of the moving picture data in the video content data, which belongs to the first partial section, is finished, playback of the moving picture data in the video content data, which belongs to the second partial section, by skipping playback of a section intervening between the first partial section and the second partial section.

9. The electronic apparatus according to claim 5, wherein the playback process module is configured to execute a process of successively displaying a plurality of still images which are extracted from the moving picture data of the predetermined attribute section in the video content data, thereby to execute the playback of the moving picture data of the predetermined attribute section in the video content data.

10. The electronic apparatus according to claim 5, wherein the image extraction module is configured to extract a still image of at least one frame from each of a plurality of sections which constitute the sequence of the video content data; and
wherein the playback process module is configured to execute, in a case where a first section and a second section, which are continuous in the plurality of sections, belong to the predetermined attribute section, the playback of the moving picture data in the video content data, which belongs to the first section, on an image display position on the predetermined display area, where the still image extracted from the first section is displayed, to change, when the section that is an object of playback shifts from the first section to the second section with a progress of playback of the moving picture data, the image display position on the predetermined display area, which is used for the playback of the moving picture data in the video content data which belongs to the predetermined attribute section, to an image display position on the predetermined display area, where the still image extracted from the second section is displayed, and to execute the playback of the moving picture data in the video content data of the second section on the changed image display position.

11. The electronic apparatus of claim 5, wherein the plurality of attribute sessions include a commercial section, a section other than the commercial section, a music section in which music is played, a talk section in which a talk is made by a person, a cheer section having a cheer level of a predetermined value or more and an excitement section having an excitement level of a predetermined value or more, which are included in the video content data.

12. A non-transitory computer-readable storage medium having stored thereon a computer program controlling a computer to execute functions of:
- executing an indexing process of analyzing audio data included in video content data, and outputting, based on a result of the analyzing the audio data, section attribute information which specifies a start time point and an end time point of at least one predetermined attribute section of a plurality of attribute sections;
- extracting still images from the video content data;
- displaying, on a predetermined display area on a display screen, the extracted still images by arranging the extracted still images in line in an order of time of appearance of the extracted still images, such that a still image selected from the extracted still images is displayed with a first lateral width size and each of the other still images is displayed with a smaller lateral width size than the first lateral width size;
- displaying, on the display screen, a section bar including a bar area which is indicative of a position of the predetermined attribute section in a sequence of the video content data, on the basis of the section attribute information;
- specifying an image display position on the predetermined display area, where the still image extracted from the predetermined attribute section is displayed; and
- starting playback of moving picture data of the predetermined attribute section in the video content data, on the specified image display position on the predetermined display area, such that the moving picture data of the predetermined attribute section is displayed with the first lateral width size on the specified image display position, in a case where an event of requesting playback of the video content data of the predetermined attribute section is input.

13. The non-transitory computer-readable storage medium of claim 12, wherein the plurality of attribute sessions include a commercial section, a section other than the commercial section, a music section in which music is played, a talk section in which a talk is made by a person, a cheer section having a cheer level of a predetermined value or more and an excitement section having an excitement level of a predetermined value or more, which are included in the video content data.

* * * * *